United States Patent
Dupont

(10) Patent No.: US 8,376,888 B2
(45) Date of Patent: Feb. 19, 2013

(54) TRANSMISSION

(75) Inventor: Anthony James Dupont, Boise, ID (US)

(73) Assignee: Anthony James DuPont, Boise, ID (US)

( * ) Notice: Subject to any disclaimer, the term of this patent is extended or adjusted under 35 U.S.C. 154(b) by 238 days.

(21) Appl. No.: 12/450,831

(22) PCT Filed: Apr. 16, 2008

(86) PCT No.: PCT/US2008/060389
§ 371 (c)(1),
(2), (4) Date: Mar. 8, 2010

(87) PCT Pub. No.: WO2008/128238
PCT Pub. Date: Oct. 23, 2008

(65) Prior Publication Data
US 2011/0086738 A1    Apr. 14, 2011

(51) Int. Cl.
*F16H 23/00* (2006.01)
(52) U.S. Cl. ......................................................... 475/163
(58) Field of Classification Search ................... 475/163; 74/60
See application file for complete search history.

(56) References Cited

U.S. PATENT DOCUMENTS

| | | | |
|---|---|---|---|
| 4,538,474 A | 9/1985 | Dzjuba et al. | |
| 4,715,249 A | 12/1987 | Tibbals, Jr. | |
| 4,873,893 A | 10/1989 | Blakemore | |
| 5,230,519 A | 7/1993 | Nishimura | |
| 5,676,534 A | 10/1997 | Hiscock | |
| 5,860,320 A * | 1/1999 | Crabb | 74/112 |
| 6,119,539 A | 9/2000 | Papanicolaou | |
| 2010/0144485 A1* | 6/2010 | Boudreau | 475/269 |

FOREIGN PATENT DOCUMENTS

| | | |
|---|---|---|
| DE | 10127094 C1 | 2/2003 |
| GB | 438004 A | 11/1935 |

OTHER PUBLICATIONS

Extended European search report, App. No. 08745897.2, Oct. 27, 2010.
Written Opinion of the International Searching Authority, PCT/US2008/060389, Aug. 8, 2008.
International Search Report, PCT/US2008/060389, Aug. 8, 2008.

* cited by examiner

*Primary Examiner* — Justin Holmes
*Assistant Examiner* — Stacey Fluhart

(57) ABSTRACT

In one embodiment, a transmission includes: a wobbler having an outer periphery tiltable with respect to a wobble axis of rotation; a set of freewheeling gears disposed in a fixed relationship with respect to one another, each gear having a gear axis of rotation about which the gear may rotate different from the gear axis of rotation of each of the other gears; one or both of the wobbler and the set of gears rotatable with respect to one another about the wobble axis of rotation; and each gear operatively connected to the wobbler simultaneously with the other gears at a place on the periphery of the wobbler different from the place at which each of the other gears is operatively connected to the wobbler such that each gear rotates on its axis of rotation as the wobbler wobbles or as the wobbler induces a wobble in another part.

26 Claims, 29 Drawing Sheets

TRANSMISSION

CROSS REFERENCE TO RELATED APPLICATION(S)

This Application claims subject matter disclosed in U.S. Provisional Patent Application Ser. No. 60/923,829 filed Apr. 16, 2007 which is incorporated herein by reference in its entirety.

BACKGROUND

Power generators such as electric motors, internal combustion engines, and humans typically generate power most efficiently when operating within a narrow range of speeds, while a specific application for the power, a wheeled vehicle for example, might require a broad range of speeds. A transmission is often used to adapt the speed characteristics of the power generator to the speed characteristics of the power application. Many transmissions function, for example, as rotary speed changers. Transmissions are also used to convert one kind of motion to another kind of motion, converting a rotary motion input to a linear motion output for example. Transmissions may provide a torque-speed conversion from a higher speed motor to a slower but more forceful output, reducing the speed from the input to the output, or from a slower speed motor to a faster but less forceful output, increasing the speed from the input to the output. A continuously variable transmission (CVT) is a transmission in which the ratio of the torque and speeds of the input and the output can be varied continuously within a given range, providing an infinite number of possible torque-speed ratios within that range.

DRAWINGS

FIGS. 17-21 are a sequence of perspective views illustrating the wobble ring and ring follower driving one of three planetary gears in the transmission shown in FIGS. 2-4 at a tilt angle of 30° through one wobble cycle.

DESCRIPTION

Embodiments of the present invention are directed to a transmission that utilizes a wobble ring to provide the desired torque-speed ratio between an input and an output. Embodiments may be implemented, for example, in a bicycle transmission as shown in the Figures and described below in this Description. Embodiments of the new transmission, however, are not limited to bicycle transmissions but may be implemented in other devices or used for other applications, nor is the invention limited to the specific transmissions shown and described. The example embodiments shown in the Figures and described below illustrate but do not limit the scope of the invention.

As used in this document:

a "bearing" means a part on or in which another part turns or slides;

a "clutch" means a coupling used to connect and disconnect a driving part and a driven part;

"freewheel" or "freewheeling" refers to a driven part being disconnected from the driving part when the driven part rotates faster than the driving part (a "freewheeling clutch", for example, means a clutch that disconnects the driving part from the driven part when the driven part rotates faster than the driving part and a "freewheeling gear", for another example, means a driven gear that is disconnected from the driving part, through a freewheeling clutch for example, when the driven gear rotates faster than the driving part—a driven part may be, and often is, both a driven part and a driving part, as in the planetary gear assemblies described below);

a "gear" means a part that meshes with or otherwise engages another part to transmit motion or to change speed or direction;

"planetary" gears and a "sun gear" means one set of gears (the planetary gears) positioned around and engaging another gear (the sun gear) whether or not the planetary gears revolve around the sun gear;

"stationary" means stationary with respect to other parts of the transmission (even though the stationary part may be moving with a vehicle to which it is attached along with other parts of the transmission); and a "wobbler" means a part that wobbles as it rotates when tilted relative to the axis of rotation or that induces a wobble in a part that rotates around the wobbler when the wobbler is tilted relative to the axis of rotation.

The article "a" or "an" as used in the Claims means one or more. If only one of something is required in a Claim, then "a single" or "only one" is recited.

First Embodiment—Rotating Wobbler And Stationary Cage, Double Driver

Figure 1:
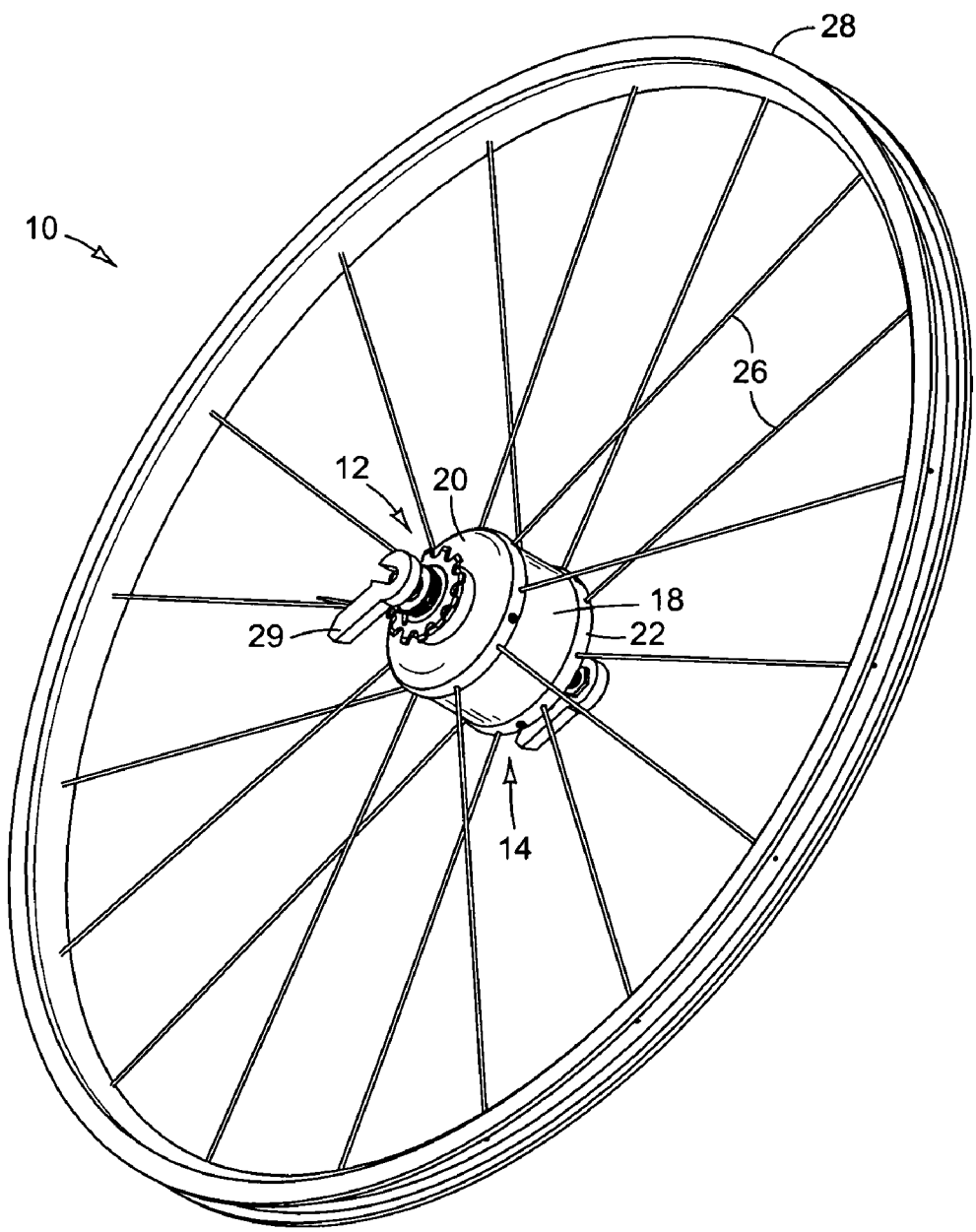
FIG. 1 is a perspective view of a bicycle rear wheel in which the wheel hub houses a transmission, according to one embodiment of the invention.
Figure 2:
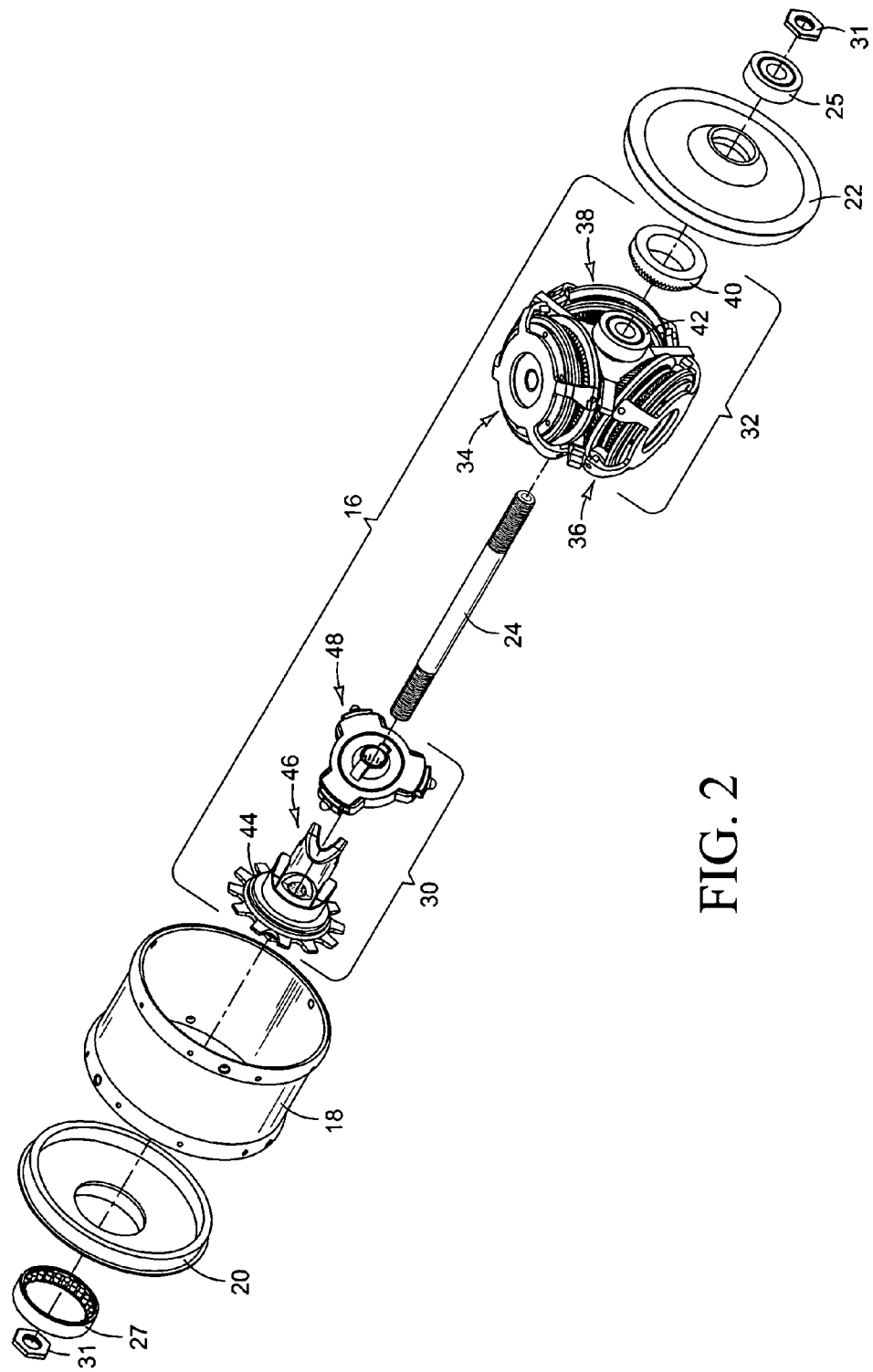
FIG. 2 is in exploded perspective view of the hub and transmission assembly from the bicycle wheel shown in FIG. 1.

FIG. 1 is a perspective view of a bicycle rear wheel 10 that includes a hub and transmission assembly 12 constructed according to one embodiment of the invention. FIG. 2 is in exploded perspective view of hub and transmission assembly 12. Referring to FIGS. 1 and 2, assembly 12 includes a hub 14 and a transmission 16. Hub 14 includes a cylindrical body 18 affixed to side covers 20 and 22. Hub 14 is supported for rotation on a stationary axle 24 at side cover 22 through a hub/axle bearing 25, as best seen in FIG. 2. Hub 14 is supported for rotation on the drive shaft at side cover 20 through a hub/drive shaft bearing 27, as best seen in FIG. 2 (the interconnection between the drive shaft and axle 24 is described below). Spokes 26 connect hub 14 to a rim 28 as shown in FIG. 1. Truncated portions of drop-out forks 29 are shown at the ends of axle 24 in FIG. 1 for mounting wheel 10 to the bicycle frame. A pair of axle nuts 31 help secure wheel 10 to the bicycle frame. As described in detail below, transmission 16 includes two primary sub-assemblies—an input assembly 30 and an output assembly 32.

Figure 3:
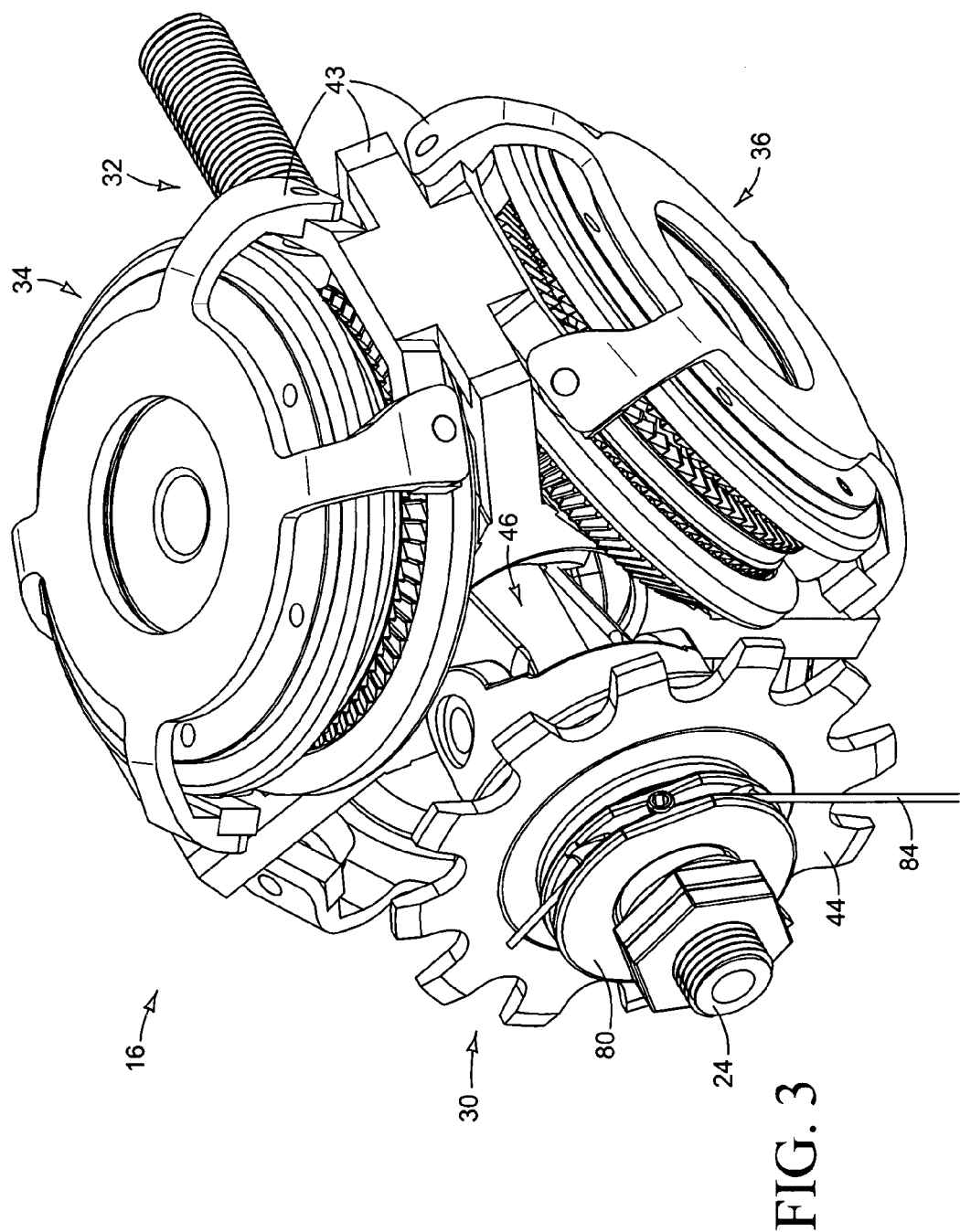
FIGS. 3 and 4 are perspective views of the transmission shown in FIG. 2.
Figure 4:
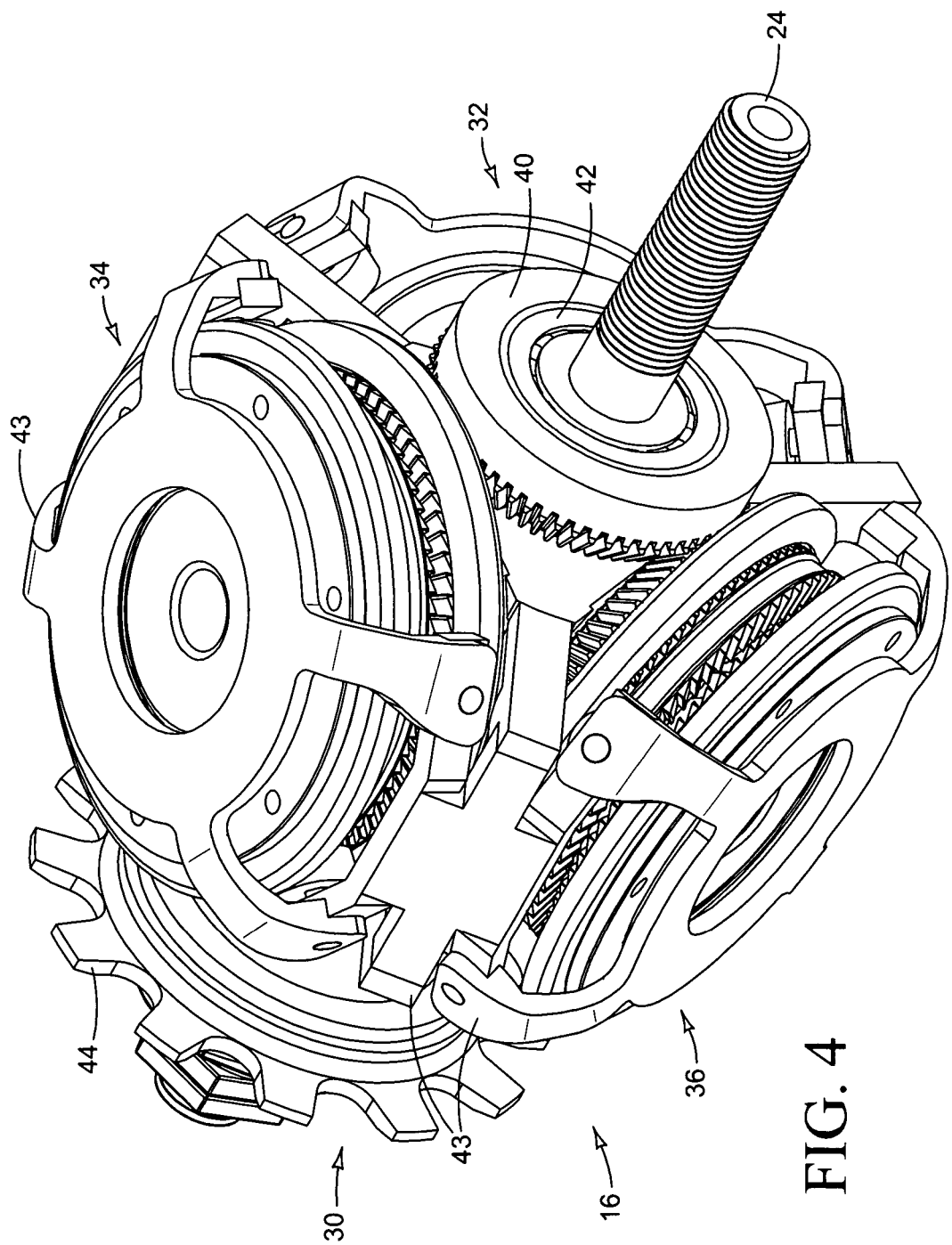

FIGS. 3 and 4 are perspective views of transmission 16. Referring now to FIGS. 2-4, output assembly 32 includes three planetary gear assemblies 34, 36 and 38 that engage and drive a sun gear 40. A planetary gear assembly 34-38 is sometimes also referred to as a PGA 34-38 for convenience. Sun gear 40 is pressed into or otherwise affixed to hub side cover 22 (FIG. 2) and supported for rotation on axle 24 through a sun gear/axle bearing 42. Alternatively, sun gear 40 may be operatively coupled to hub 14 through a "freewheeling" clutch or other suitable unidirectional coupler that transmits torque in one direction but idles in the opposite direction, thus allowing wheel 10 to coast without driving sun gear 40. Planetary gear assemblies 34-38 are held in a fixed relationship relative to one another and to sun gear 40 through a cage 43. Cage 43 is supported on and affixed to axle 24. Thus, planetary gear assemblies 34-38 are stationary with respect to axle 24, with respect to one another, and with respect to sun gear 40.

The use of the planetary/sun gear descriptive metaphor may not be strictly accurate here in the classic sense because the planetary gear assemblies 34-38 do not revolve around sun gear 40 (although they could). Rather, the planetary gear in each assembly 34-38 rotates only on its own axis without also revolving around sun gear 40. Still, the metaphor is useful in accordance with its common usage, as defined above, to indicate one set of gears (the planetary gears) positioned around and engaging another gear (the sun gear) whether or not the planetary gears revolve around the sun gear.

Figure 5:
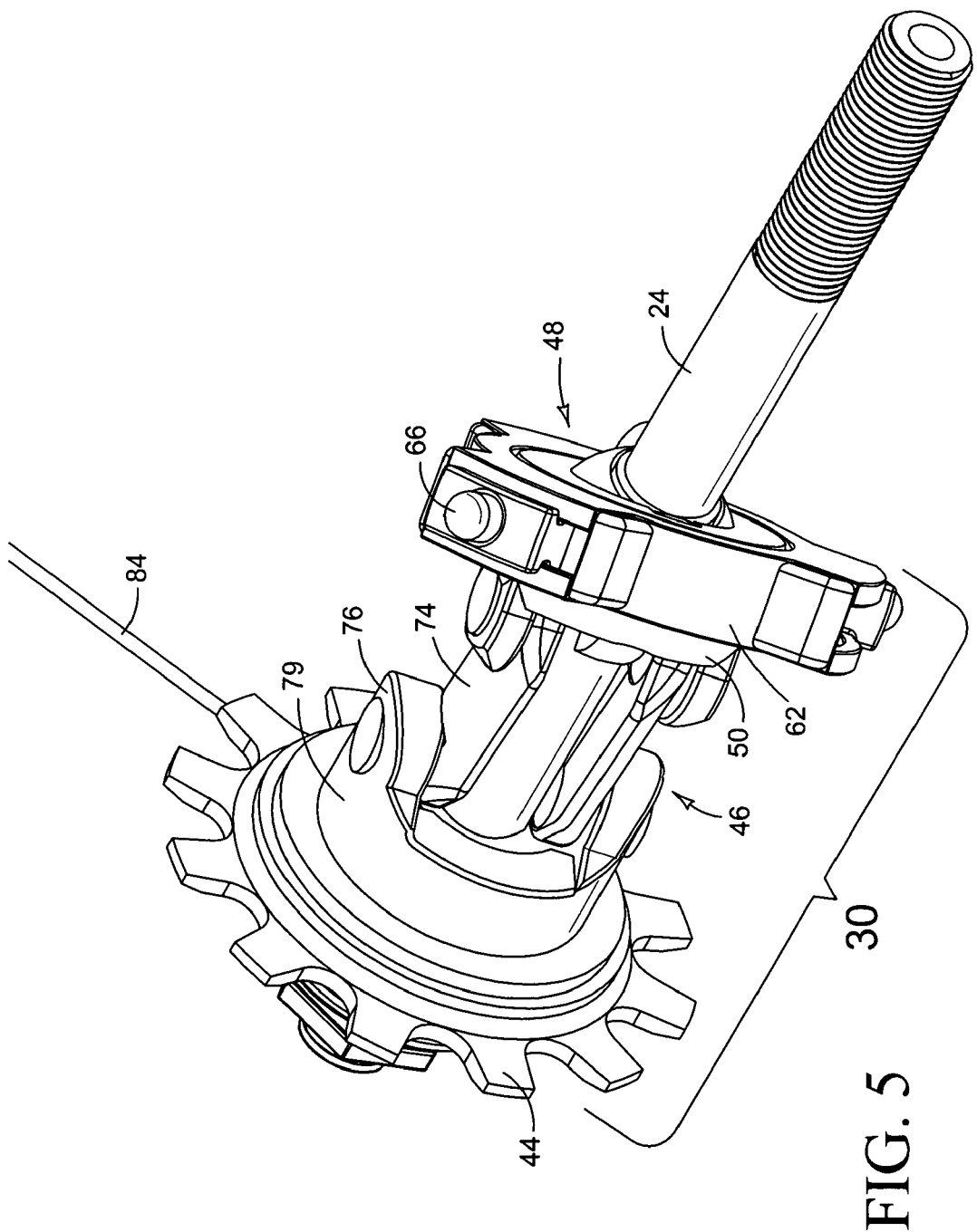
FIG. 5 is a perspective view of the input assembly in the transmission shown in FIGS. 2-4.

FIG. 5 is a perspective view of input assembly 30. Referring now to FIGS. 3-5, input assembly 30 includes a chain sprocket 44 affixed to a drive shaft 46. Drive shaft 46 is operatively coupled to each planetary gear assembly 34-38 through a wobbler assembly 48. As described in detail below, wobbler assembly 48 may be adjusted to adapt the speed characteristics of the power generator, a human pedaling the bicycle to turn sprocket 44 in this embodiment, to the desired speed characteristics of the power application, driving hub 14 and wheel 10. Of course, the characteristics of other components of transmission 16 also determine the torque-speed conversion ratios, but these characteristics are fixed for a specific transmission 16. Thus, wobbler assembly 48 is the adjustable element used to control variations in the torque-speed ratios in transmission 16. Torque-speed ratios are also commonly referred to simply as speed ratios.

Figure 6:
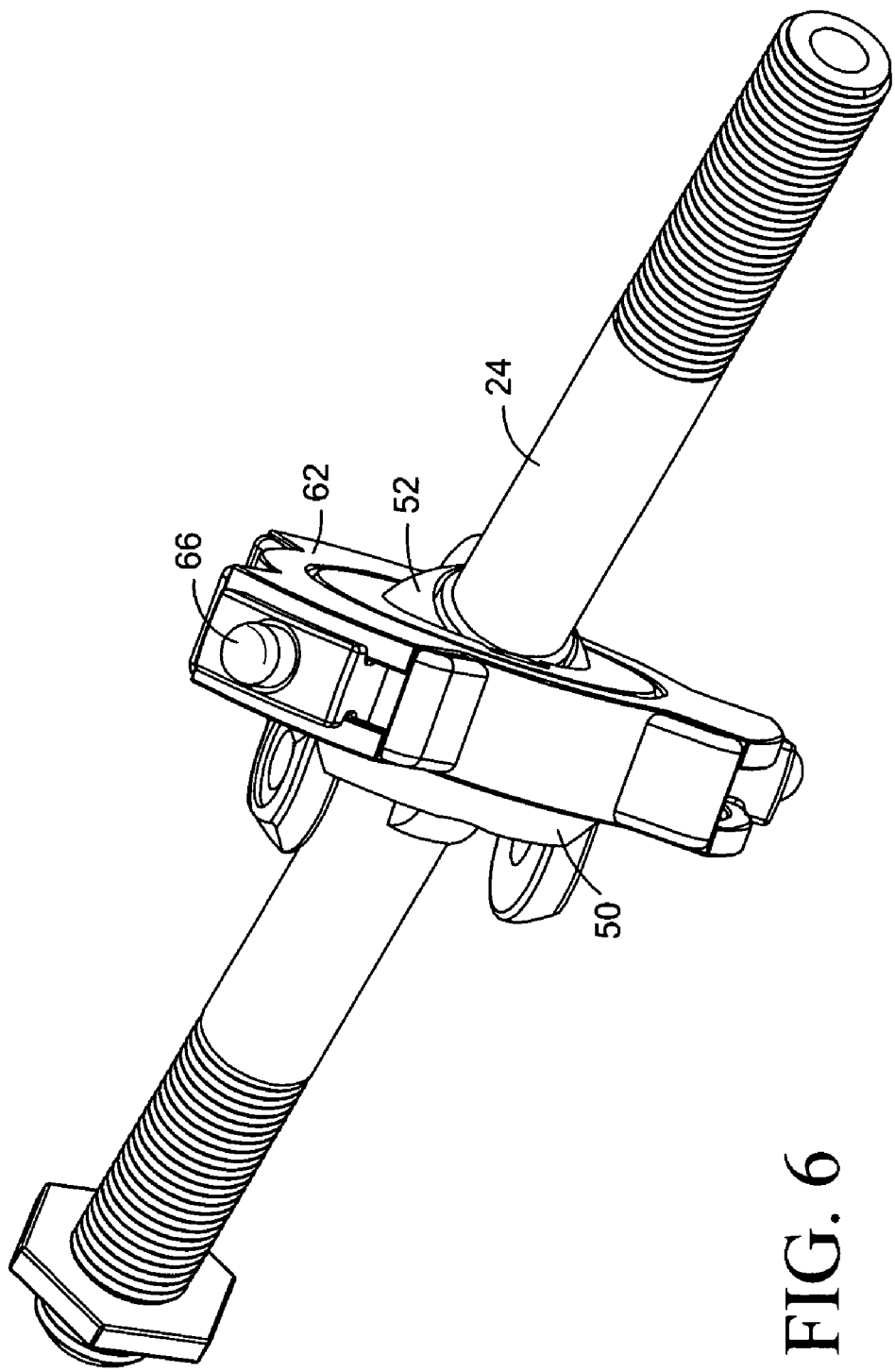
FIG. 6 is a perspective view of the wobbler assembly in the transmission shown in FIGS. 2-4.
Figure 7:
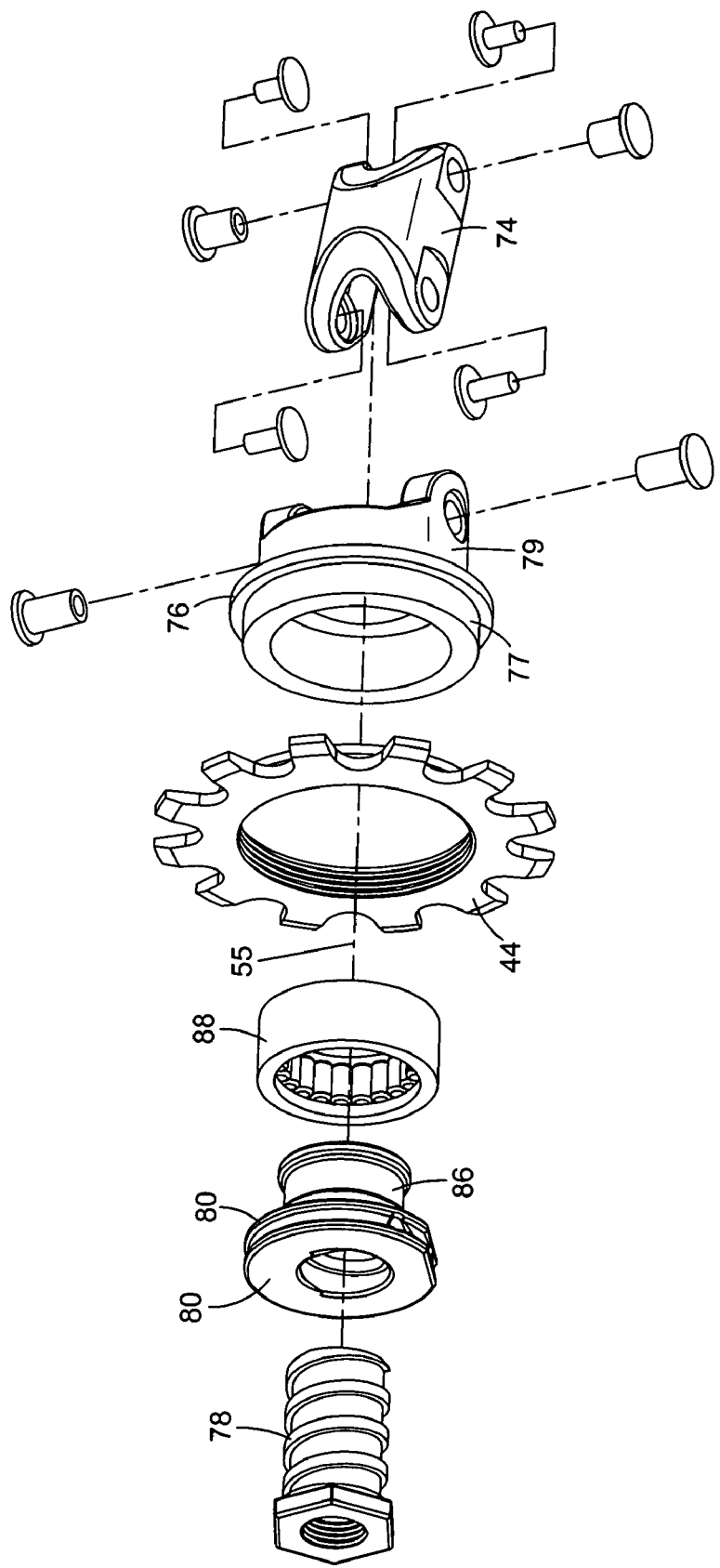
FIGS. 7 and 8 are exploded perspective views of the input assembly in the transmission shown in FIGS. 2-4.
Figure 8:
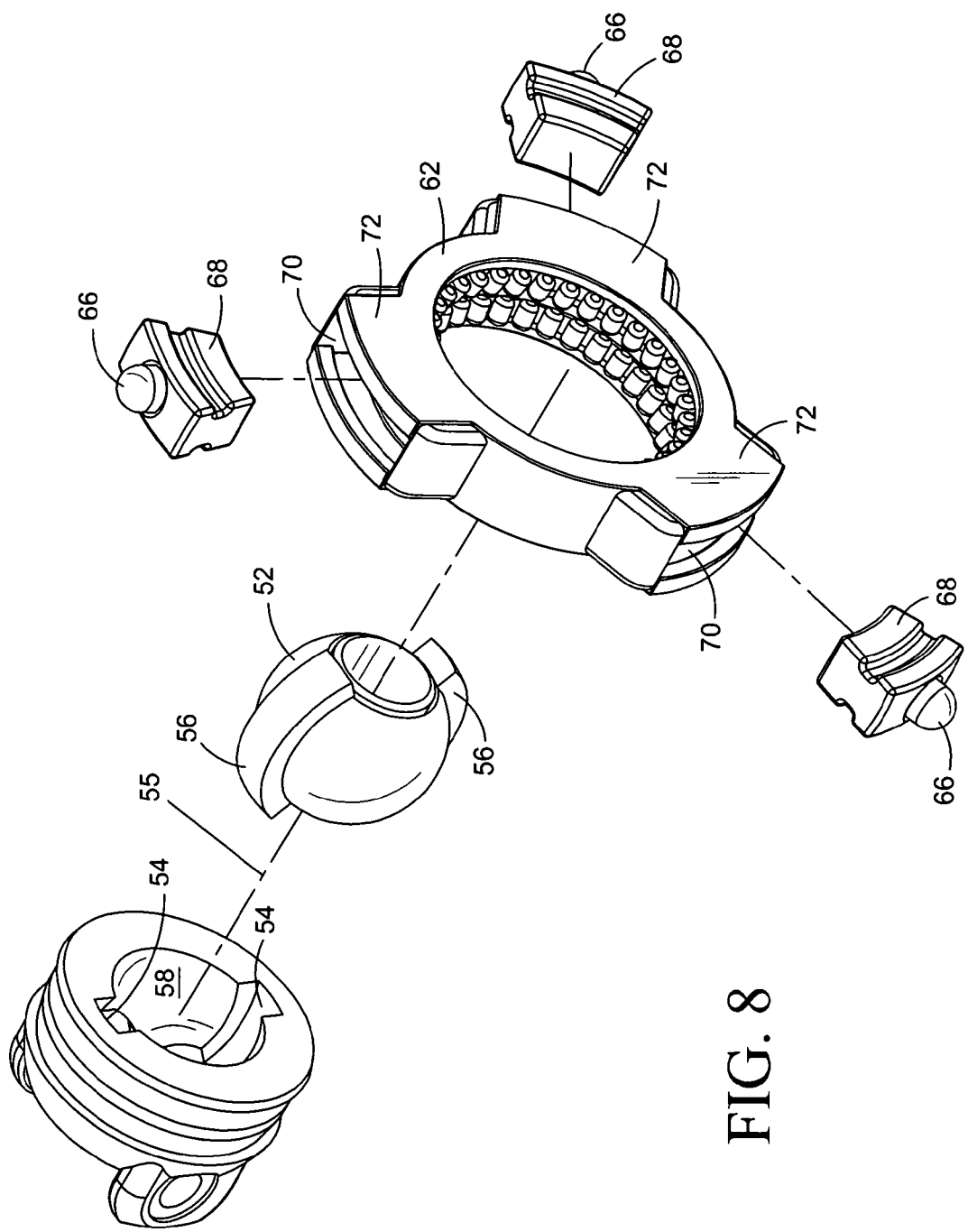

FIG. 6 is a perspective view of wobbler assembly 48 and FIGS. 7 and 8 are exploded perspective views of input assembly 30. Referring now to FIGS. 5-8, wobbler assembly 48 includes a wobbler 50 supported for rotation on axle 24 through a wobble ring/axle bearing 52. In the embodiment shown, wobbler 50 is configured as a ring. Thus, wobbler 50 is also sometimes referred to as wobble ring 50. A pair of arcuate slots 54 along the inner surface of wobble ring 50 key to a corresponding pair of arcuate ridges 56 along the outer surface of bearing 52, coupling ring 50 to bearing 52 for rotation on axle 24 while still allowing wobble ring 50 to tilt on bearing 52 with respect to the longitudinal axis 55 of axle 24. Although, in the embodiment shown, interior surface 58 of wobble ring 50 and outer surface 60 of bearing 52 are formed as mating spherical surfaces that allow ring 50 to tilt relative to bearing 52 and axle 24, other suitable configurations may be used to couple wobble ring 50 to bearing 52 for rotation on axle 24 while still allowing ring 50 to tilt on bearing 52 with respect to the longitudinal axis 55 of axle 24. Wobbler assembly 48 also includes a follower 62 mounted to wobble ring 50 through a ring/follower bearing 64. Bearing 64 allows follower 62 to remain rotationally stationary as wobble ring 50 rotates on axle 24 inside follower 62. That is to say, follower 62 does not rotate relative to axle 24 as it follows the wobbling ring 50.

Follower drive posts 66 are mounted along the outer periphery of follower 62. As described in more detail below, each drive post 66 engages a drive mechanism in a corresponding one of the planetary gear assemblies 34-38. Each post 66 is affixed to or integral with a slide rail 68 that slides in a track 70 on a projecting part 72 that forms the extreme outer periphery of follower 62. If posts 66 were to be stationary on follower 62, then, as follower 62 wobbles at the urging of a wobbling wobble ring 50, each post 66 would trace a three-dimensional nutating path. Nutation refers to the wobbly rotation of a spinning object Posts 66 sliding along tracks 70, however, allows each post 66 to trace a substantially curvilinear path back and forth in a single plane as follower 62 wobbles.

A segmented drive shaft 46 includes an inner segment 74 and an outer segment 76. Segments 74 and 76 are pinned or otherwise gimbaled together so that segments 74 and 76 may pivot with respect to one another. Wobble ring 50 is pinned or otherwise gimbaled to drive shaft inner segment 74 so that ring 50 and inner segment 74 may pivot with respect to one another and so that ring 50 may pivot on axle bearing 52. Thus, drive shaft 46 drives wobble ring 50. Sprocket 44 is affixed to an outer part 77 of drive shaft outer segment 76. (An inner part 79 of drive shaft outer segment 76 serves as the inner race for hub/drive shaft bearing 27 shown in FIG. 2.) An externally threaded shifting sleeve 78 is affixed to or integral with axle 24. A discrete shifting sleeve 78 may be threaded on to axle 24 and fixed into position, for example, with a set screw (not shown). An internally threaded shifting ring 80 turns on sleeve 78, moving in and out along axle 24. Shifting ring 80 includes a larger diameter outer part 82 that receives a shifting cable 84 (FIG. 5) and a smaller diameter inner part 86 that serves as an inner race for a bearing 88 that supports drive shaft 46 (at inner segment 74) for rotation relative to axle 24 and shifting ring 80. Shifting ring 80 bears against sprocket 44 and/or drive shaft inner segment 74 (through drive shaft/axle bearing 88). Shifting ring 80 turns on sleeve 78, moving in or out to adjust the position of drive shaft 46 longitudinally along axle 24 and, accordingly, to adjust the tilt of wobble ring 50, as described in more detail below.

Figure 9:
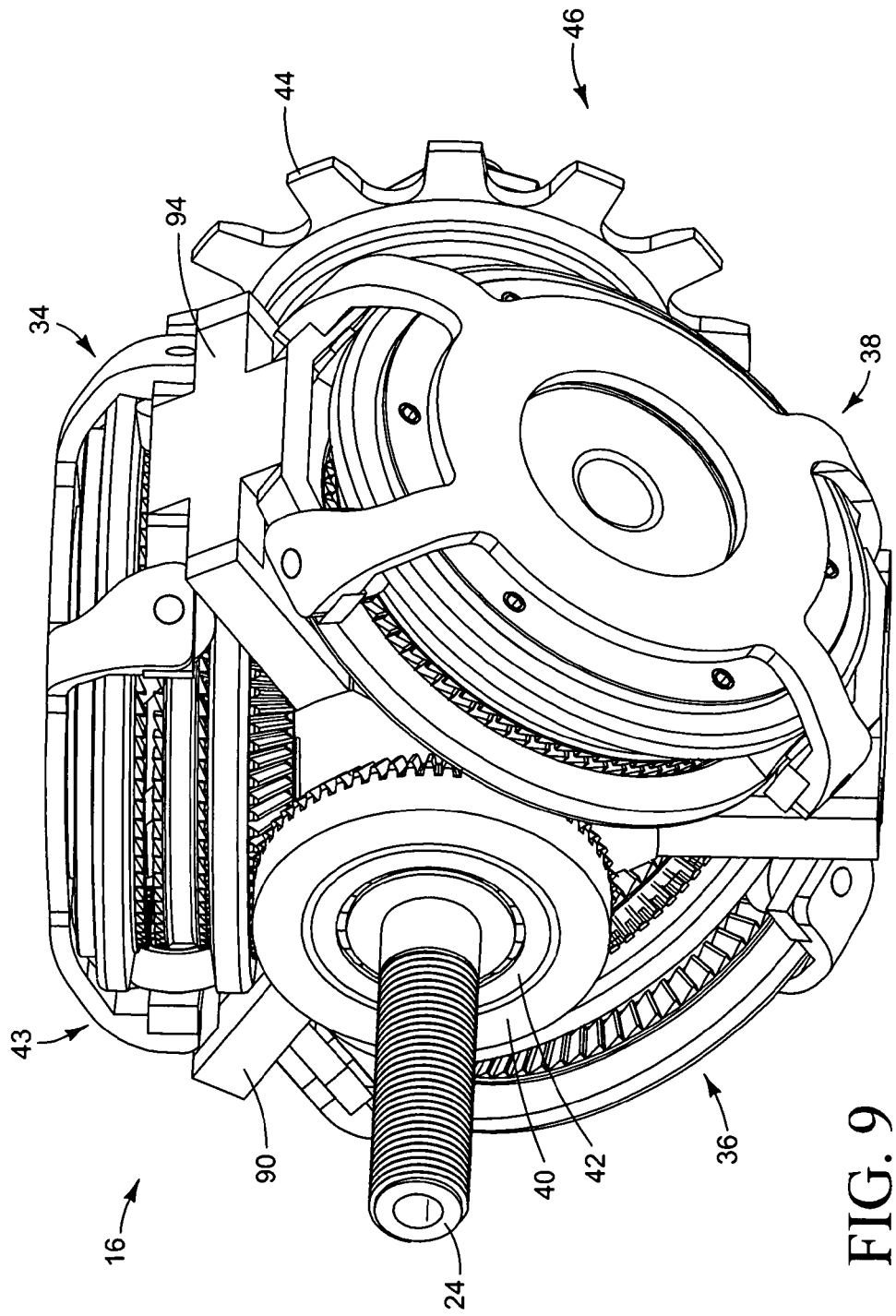
FIGS. 9-11 are perspective views of the transmission shown in FIGS. 2-4. The transmission is partially disassembled in each of FIGS. 10 and 11 to show some of the components not visible in the view of FIG. 9.
Figure 10:
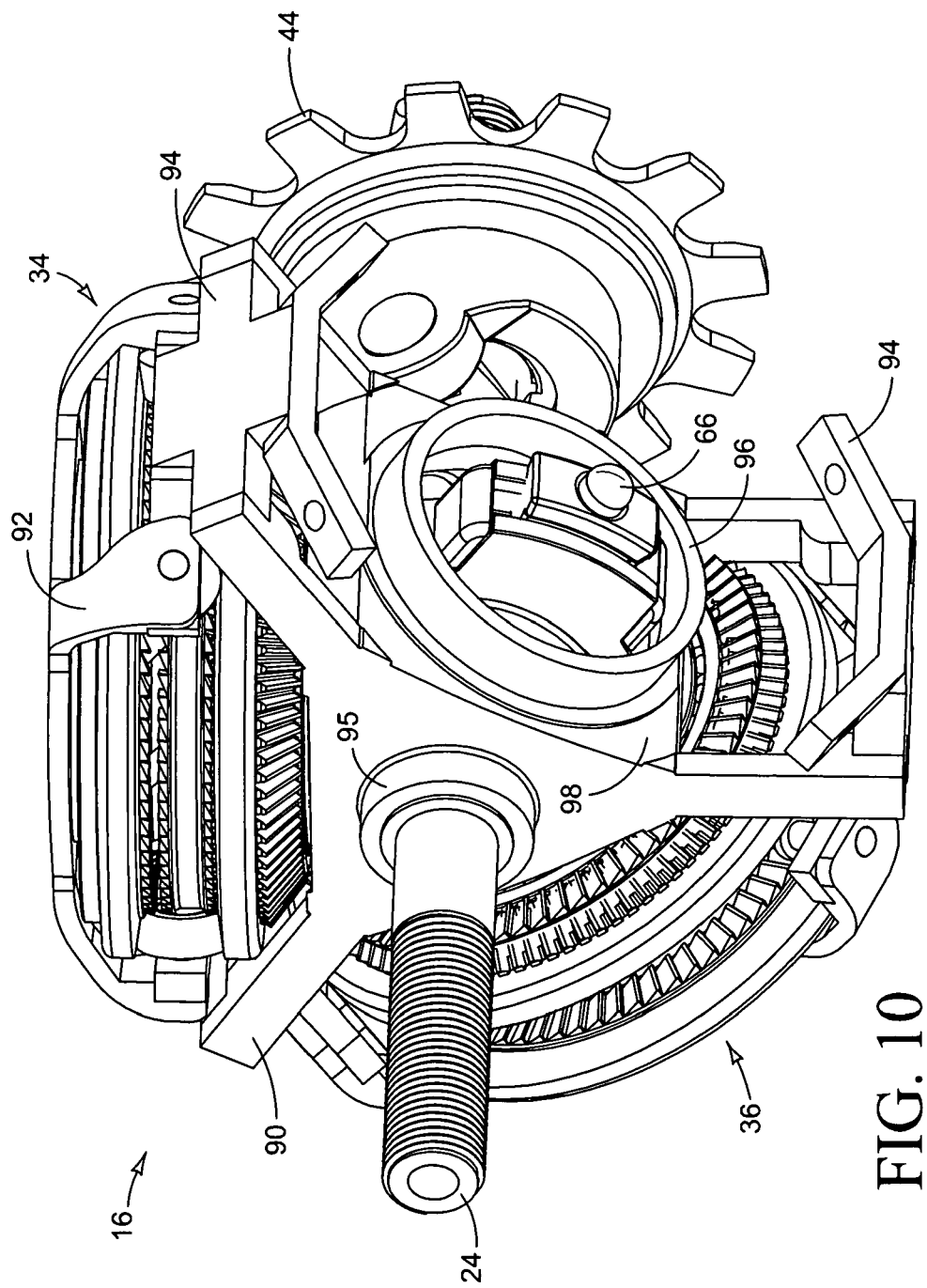
Figure 11:
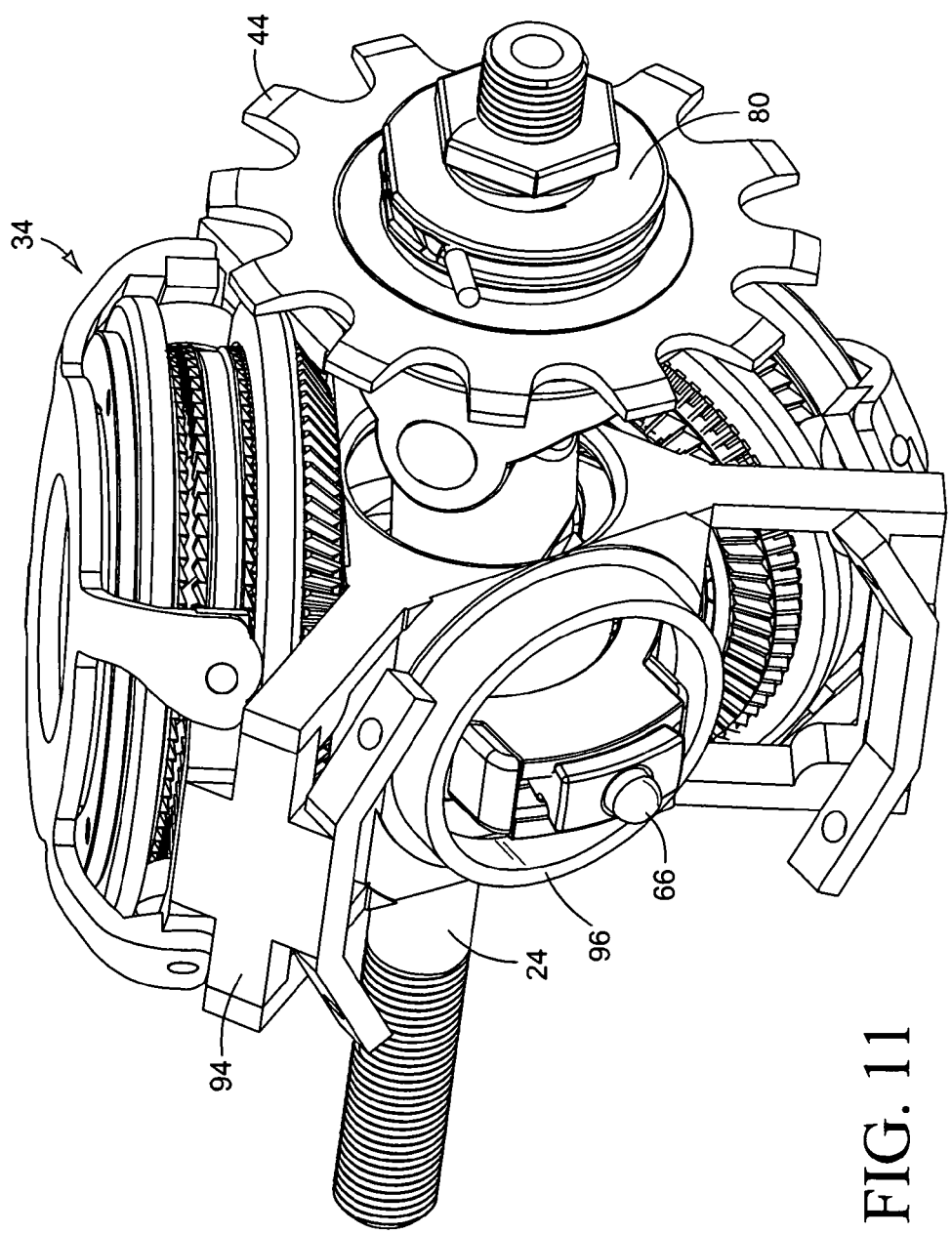
Figure 12:
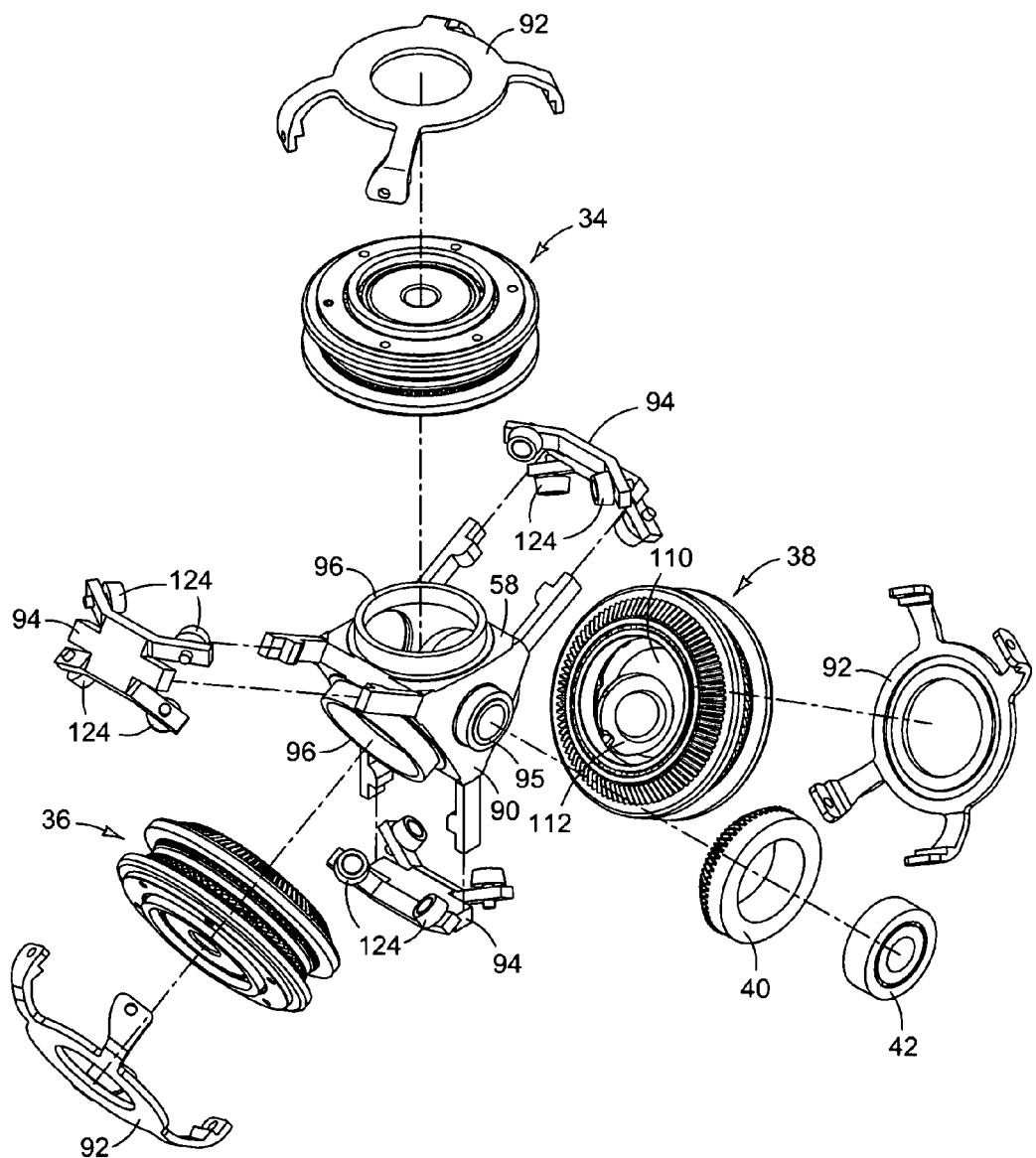
FIG. 12 is an exploded perspective view of the output assembly of the transmission shown in FIGS. 9-11.
Figure 13:
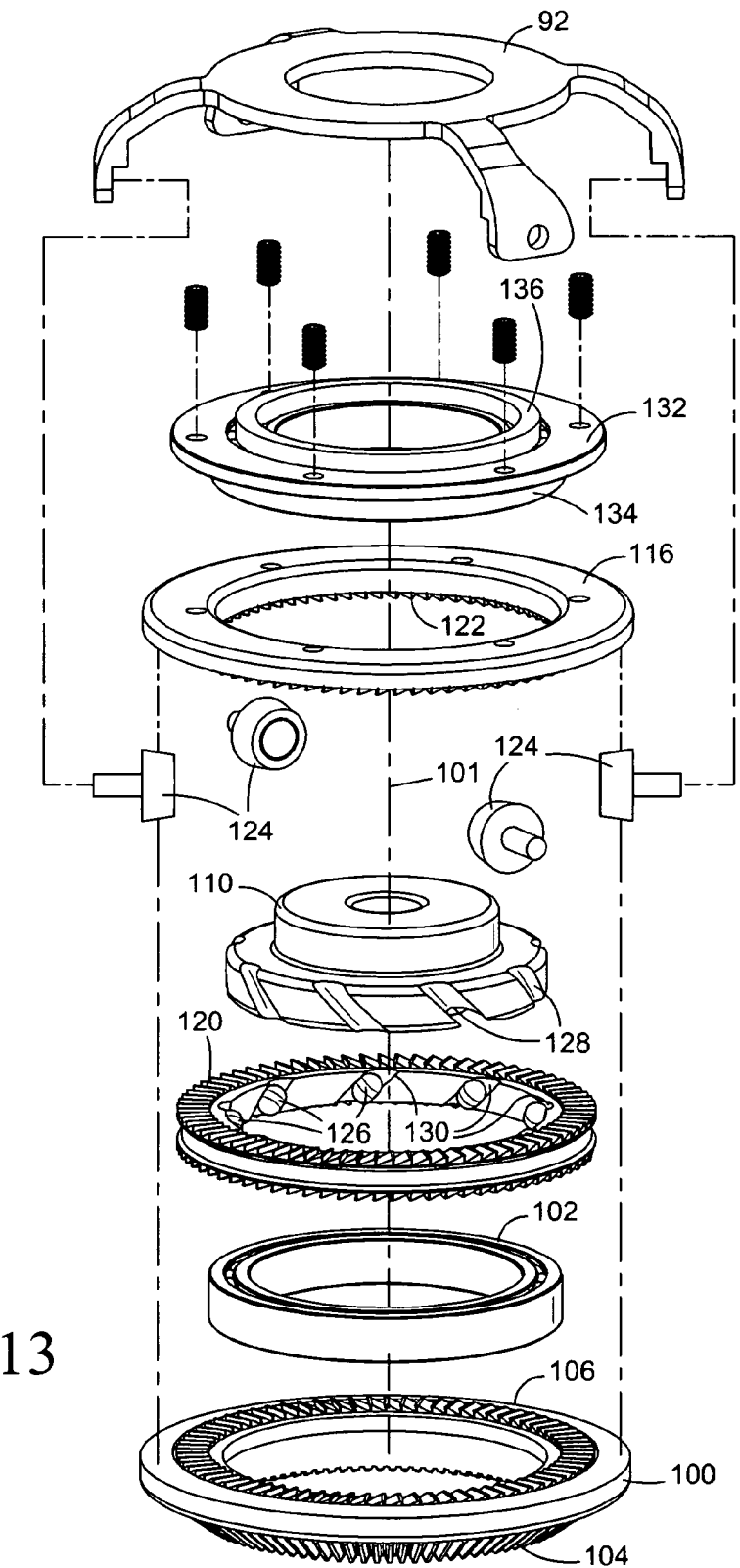
FIG. 13 is an exploded perspective view of one of the planetary gear assemblies in the output assembly of the transmission shown in FIGS. 9-11.

FIGS. 9-11 are perspective views of transmission 16. Transmission 16 is partially disassembled in each of FIGS. 10 and 11 to show some components not visible in the view of FIG. 9. FIG. 12 is an exploded perspective view of output assembly 32 in transmission 16 and FIG. 13 is an exploded perspective view of a planetary gear assembly 34, 36, 38 in output assembly 32. Referring to FIGS. 9-13, each planetary gear assembly 34-38 is held in a fixed relationship relative to the other planetary gear assemblies and to sun gear 40 through cage 43. Cage 43 includes a series of there interconnected parts that support and retain each planetary gear assembly in the proper position—a central housing 90, retainers 92 and connectors 94. Each spider like retainer 92 is affixed to cage housing 90 through a respective connector 94. Cage housing 90 is supported on axle 24 at one end adjacent to sun gear 40, as best seen in FIG. 10. Each of three rims 96 protruding from sides 98 of cage housing 90 define an opening through which wobble drive posts 66 extend to engage planetary gear assemblies 34-38.

Referring now primarily to the exploded view of FIG. 13, each planetary gear assembly 34-38 includes a planetary gear 100 supported for rotation about a PGA axis 101 on a cage rim 96 (FIGS. 10-12) through a PGA/cage bearing 102. In the embodiment shown, planetary gear 100 is a compound part that includes an outward facing bevel gear part 104 that engages sun gear 40 at a 90° angle and an inward facing sawtooth part 106. (Sawtooth part 106 is functionally part of clutch 108, described below.) Other configurations are possible. For example, each planetary gear 100 could engage sun gear 40 at other angles and/or using means other than meshing teeth to transfer motion from planetary gear 100 to sun gear 40.

A freewheel PGA clutch 108 connects planetary gear 100 to (and disconnects planetary gear 100 from) drive posts 66. A freewheeling clutch, also commonly referred to as an overrunning, unidirectional, or one-way clutch, disconnects the driving part from the driven part when the driven part rotates faster than the driving part. In the embodiment shown in FIGS. 9-13 and described below, clutch 108 includes two pairs of annular sawtooth plates, each pair pressing against one another with the toothed sides together. Rotating in one direction, the sawteeth of the drive plate lock with the sawteeth of the driven plate, making it rotate at the same speed. If the drive plate slows down or stops rotating (or the driven plate speeds up), the teeth of the driven plate slip over the teeth of the drive plate and continue rotating. In the embodiment shown, clutch 108 may also be characterized as a "double" clutch in the sense that it allows planetary gear 100 to be driven forward throughout the back and forth wobble cycle of drive post 66.

PGA clutch 108 includes a driver 110 that engages drive post 66 along an arcuate drive track 112 recessed into a cupped inner face 113 of driver 110. Drive track 112 may be seen in FIG. 12 for PGA 38 and, more clearly, in FIGS. 14-24. Clutch 108 also includes a doubled sided, sawtooth annular inner plate 114 and single sided sawtooth annular outer plate 116. Double sided inner plate 114 has "driving" sawteeth 118 and 120 on both sides. Single sided outer plate 116 has "driven" sawteeth 122 on the side facing inner plate 114. Transfer gears 124 operatively couple outer plate 116 and planetary gear 100 to transfer the counterclockwise rotation of outer plate 116 to a clockwise rotation of planetary gear 100. Any suitable transfer mechanism may be used. For example, a set of frustro-conical (round, wedge shaped) friction rollers 124 pressed between complementary surfaces on inner part 106 of gear 100 and outer clutch plate 116 may be used, as shown in the figures. For another example, a set of bevel gears engaging bevel gears on inner part 106 and outer clutch part 116 might also be used to transfer the rotation of plate 116 to planetary gear 100. Note also that the term "gear" has been specially defined herein for convenience to include any part that meshes with or otherwise engages another part to transmit motion or to change speed or direction, including but not limited to toothed gears that mesh with one another and friction rollers pressed between complementary surfaces such as rollers 124 described above.

Inner clutch plate 114 is operatively coupled to driver 110 by, for example, bearing balls 126 fitted into a series of mating truncated helical grooves 128 and 130, respectively, formed along the outer diameter of driver 110 and the inner diameter of plate 114. Balls 126 transmit the rotational driving force of driver 110 to plate 114, driving plate 114 into engagement alternately with inner part 106 and outer plate 116 according to the wobble cycle of drive posts 66, while at the same time allowing plate 114 to disconnect from, and thereby freewheel on, planetary gear inner part 106 and outer plate 116. Thus, for example, when the bicycle is coasting and sun gear 40 is driving planetary gear 100, inner clutch plate 114 is pushed up into the gap between gear 100 and outer clutch plate 116, allowing gear 100 to spin freely (i.e., freewheel), disengaged from driver 110. Outer clutch plate 116 is fastened to an annular cap 132. The plate 116/cap 132 assembly is supported for rotation about PGA axis 101 on a plate/cap bearing 134. Driver 110 is supported for rotation about PGA axis 101 through a driver/cap bearing 136.

FIGS. 14-17 are perspective views illustrating speed ratio settings for wobble ring 50 and, accordingly, ring follower 62, at a tilt angle θ of 0°, 10°, 20°, and 30°, respectively. In each of FIGS. 14-17, transmission 16 is disassembled down to input assembly 30 and PGA clutch 108 for one planetary gear assembly. One of the drive posts 66 on follower 62 is engaged in track 112 of driver 110 in clutch 108. Tilt angle θ is the angle between a reference line 140 perpendicular to the longitudinal axis 55 of axle 24 and a "tilt" line 142 extending diametrically through wobble ring 50, with both lines 140 and 142 lying in the same plane. Although the tilt angle may be defined in other ways to properly reflect the tilt of wobble ring 50 with respect to axle 24, reference line 140 is selected so that a tilt angle θ of 0° corresponds to a speed ratio of zero (0.0).

Figure 14:
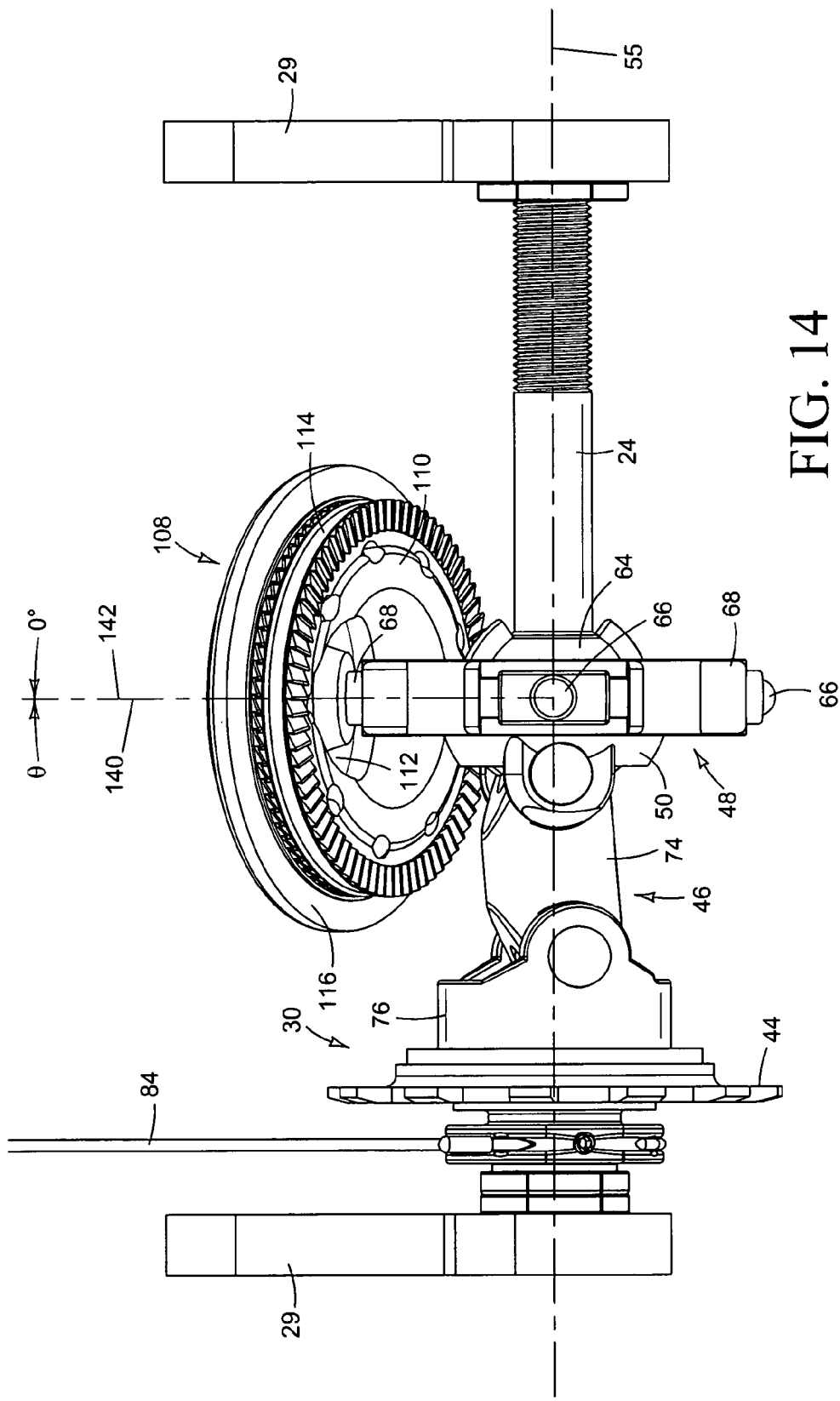
FIGS. 14-17 are perspective views illustrating speed ratio settings for a wobble ring tilt angle of 0°, 10°, 20°, and 30°, respectively.
Figure 15:
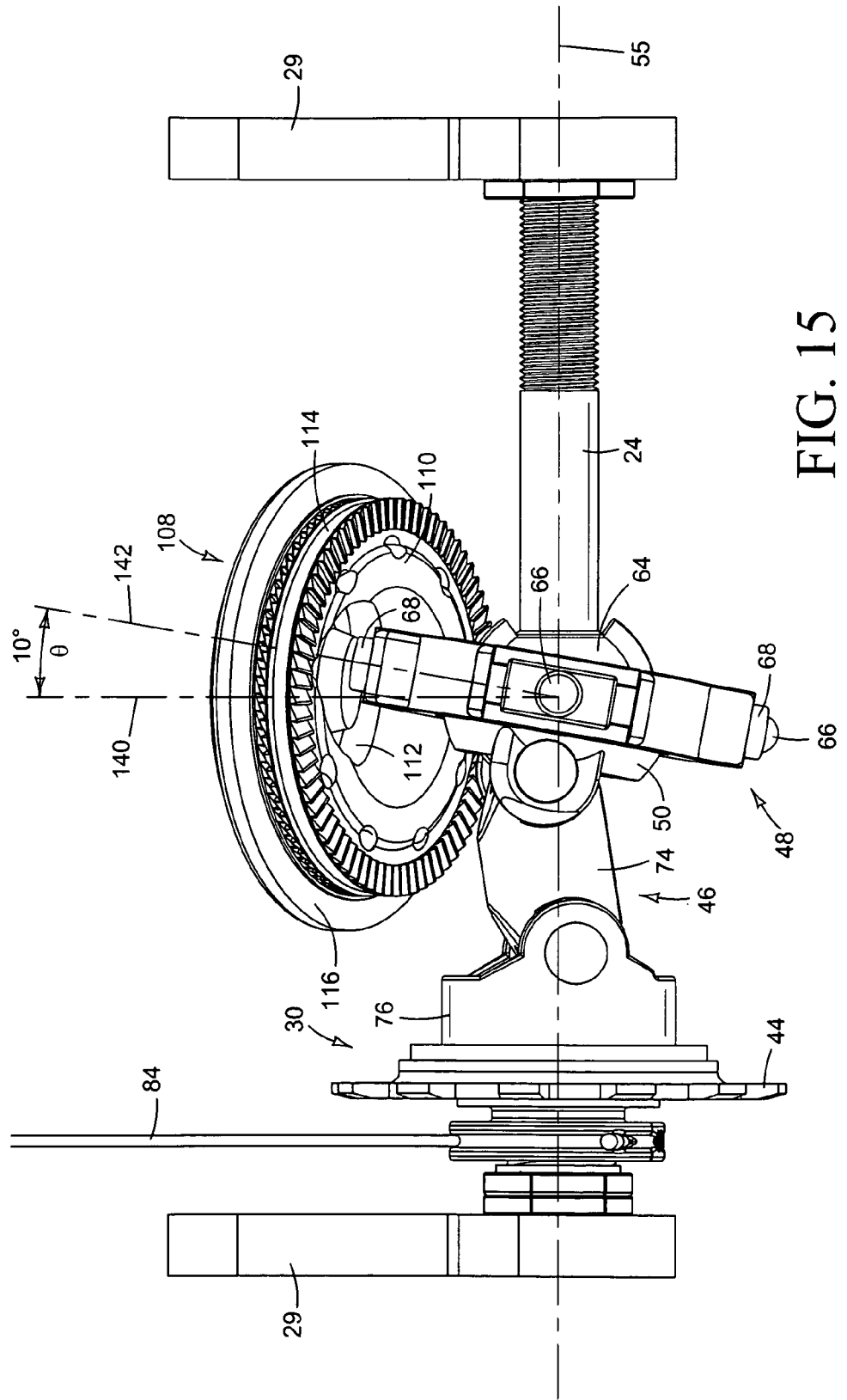
Figure 16:
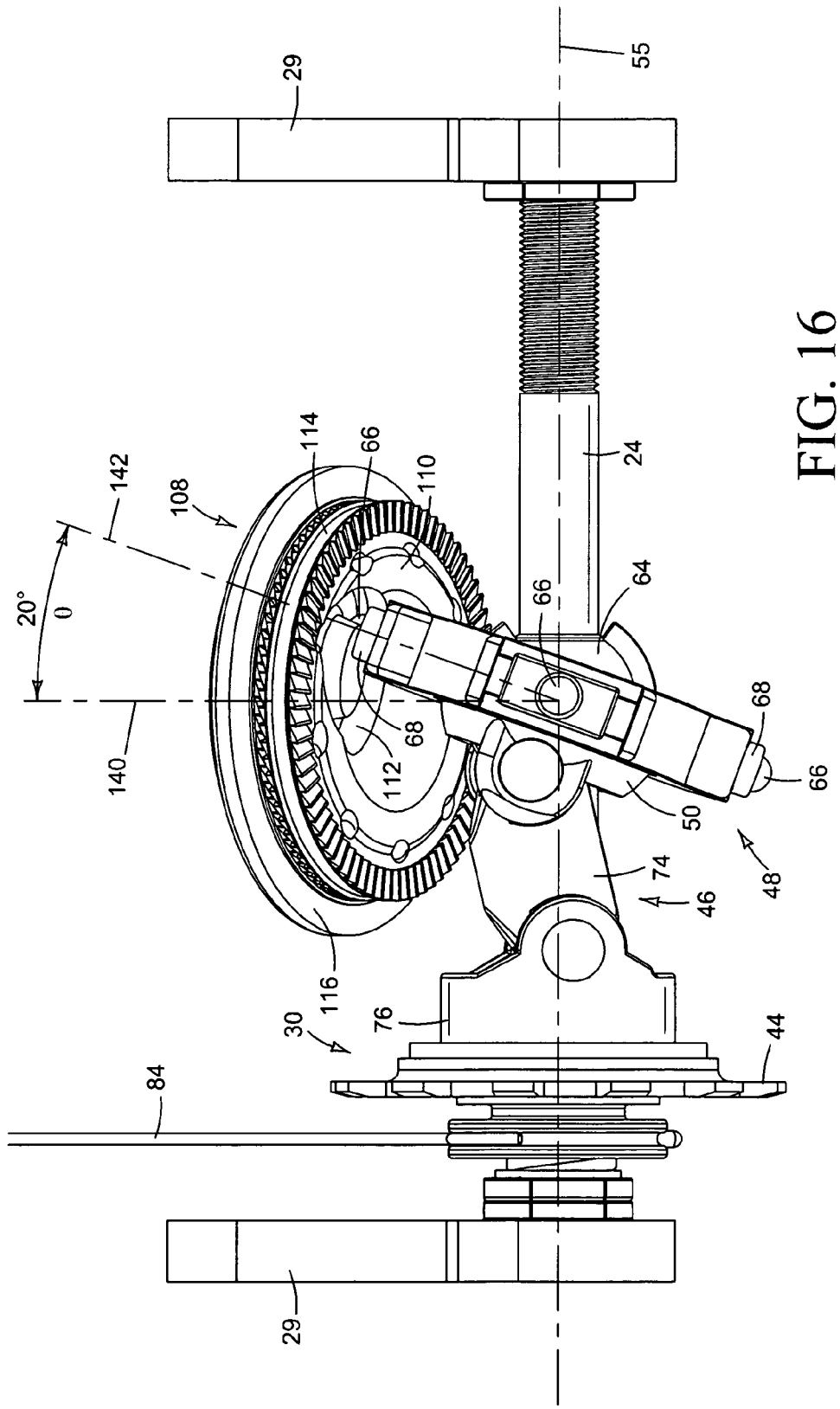
Figure 17:
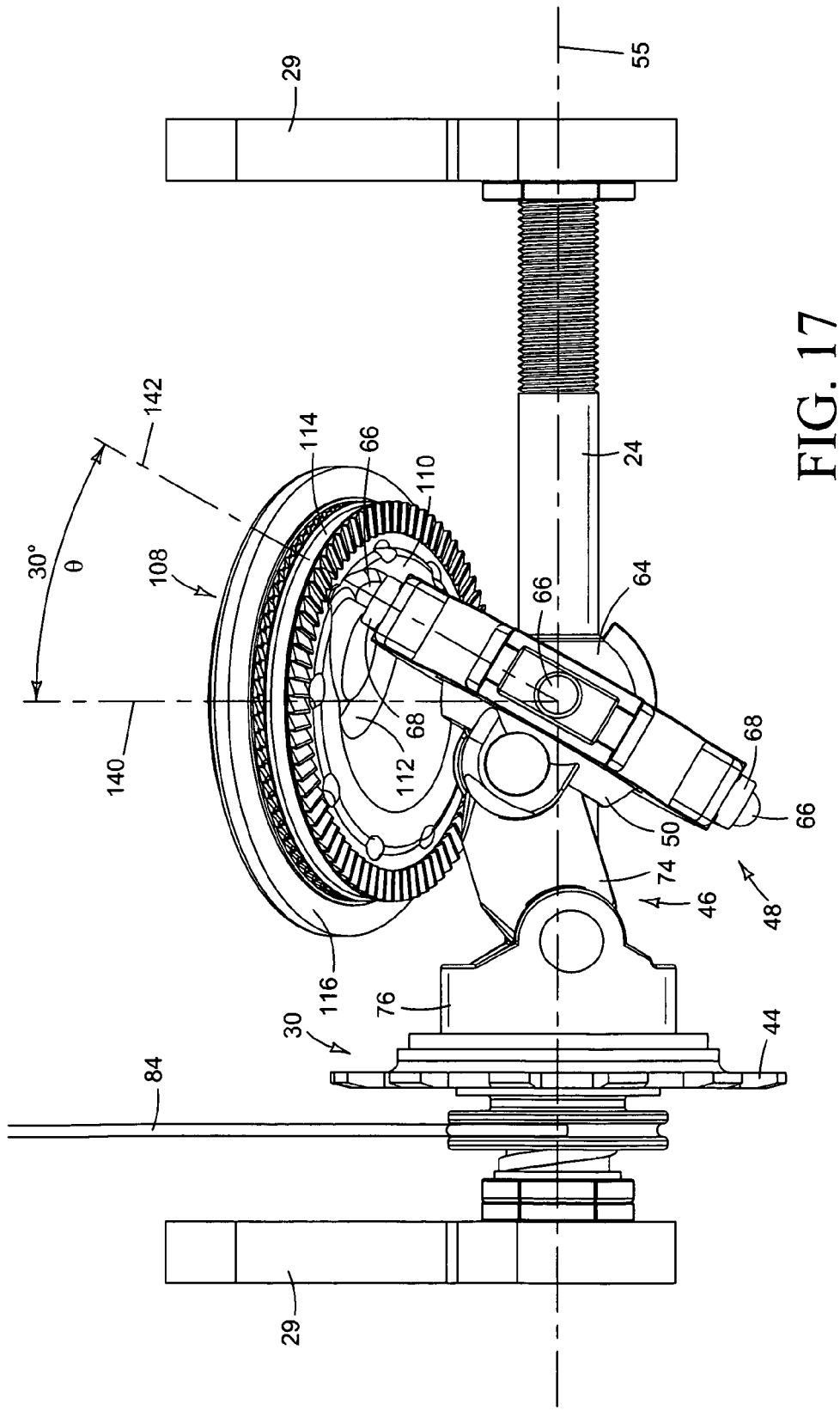

Referring to FIG. 14, at a tilt angle θ of 0°, all points on the periphery of wobble ring 52 move in the same plane as drive shaft 46 spins wobble ring 52 on axle 24 and, consequently, wobble ring 50 does not wobble. Accordingly, ring follower 62 also does not wobble and drive posts 66 are stationary—wheel 10 does not turn no matter how fast the rider pedals. Thus, the ratio of the output speed to the input speed (the speed ratio) is 0.0. Referring to FIG. 15, shifting ring 80 is rotated clockwise by pulling shifting cable 84, as best seen by comparing the position of ring 80 and cable 84 in FIGS. 14 and 15, to compress and shorten drive shaft 46. The double jointed drive shaft 46 tilts wobble ring 50 as it shortens, as best seen by comparing the positions of drive shaft inner segment 74, wobble ring 50 and follower 62 in FIGS. 14 and 15. Continued pulling of shifting cable 84 screws shifting ring 80 further down shifting sleeve 78 to further shorten drive shaft 46, increasing tilt angle θ from approximately 10° in FIG. 15 to approximately 20° in FIG. 16 and approximately 30° in FIG. 17. Increasing the tilt angle θ increases the amplitude of the wobble of ring 50 and follower 62 and, accordingly, extends the length of travel for each drive post 66 so that each post 66 will drive the corresponding planetary gear 100 through a larger angle in each wobble cycle. Thus, gears 100 spin faster as the tilt angle increases and the speed ratio delivered by transmission 16 increases from 0.0 in proportion to the increase in the tilt angle.

As noted above, drive shaft 46 drives wobbler assembly 48 through wobble ring 50. Follower 62 is mounted to wobble ring 50 through a ring/follower bearing 64 so that follower 62 may remain rotationally stationary as wobble ring 50 rotates on axle 24 inside follower 62—follower 62 does not rotate relative to axle 24 as it follows wobbling ring 50. This configuration allows the tilt angle θ to be easily adjusted at the same time wobble ring 50 is spinning, even as power is applied to drive shaft 46 and posts 66 are driving driver 110. This "shift and spin" feature allows the rider to easily and smoothly "change gears" even while pedaling madly up the steepest hill. When shifting on a traditional derailleur, the chain has to move all the way around the rear sprocket before the actual transmission shift occurs. In transmission 16, by contrast, the shift is immediate—the speed ratio changes as soon as the tilt angle changes.

The driving motion of wobbler assembly 48 through one revolution of drive shaft 46 will now be described with reference to FIGS. 17-21. In each of FIGS. 17-21, transmission 16 is disassembled down to input assembly 30 with just one planetary gear assembly clutch 108 shown. Planetary gear 100 has been removed in FIGS. 17-21 to reveal the operative connection between input assembly 30 and output assembly 32 for one of the planetary gear assemblies 34-38. It should be remembered, however, that each PGA 34-38 is being driven in the same manner simultaneously with the other PGAs 34-38. Referring to FIGS. 17-21, one of the drive posts 66 on follower 62 is engaged in track 112 of driver 110 in PGA assembly 34. The tilt angle is about 30°. Drive shaft 46 rotates about 90° from FIG. 17 to FIG. 18; 90° from FIG. 18 to FIG. 19 to a rotational position about 180° from FIG. 17; about 70° from FIG. 19 to FIG. 20 to a rotational position about 250° from FIG. 17; about 80° from FIG. 20 to FIG. 21 to a rotational position about 330° from FIG. 17; and then back to the 0° starting position of FIG. 17 to complete one revolution of drive shaft 46 and, accordingly, one wobble cycle of wobbler assembly 48.

Figure 18:
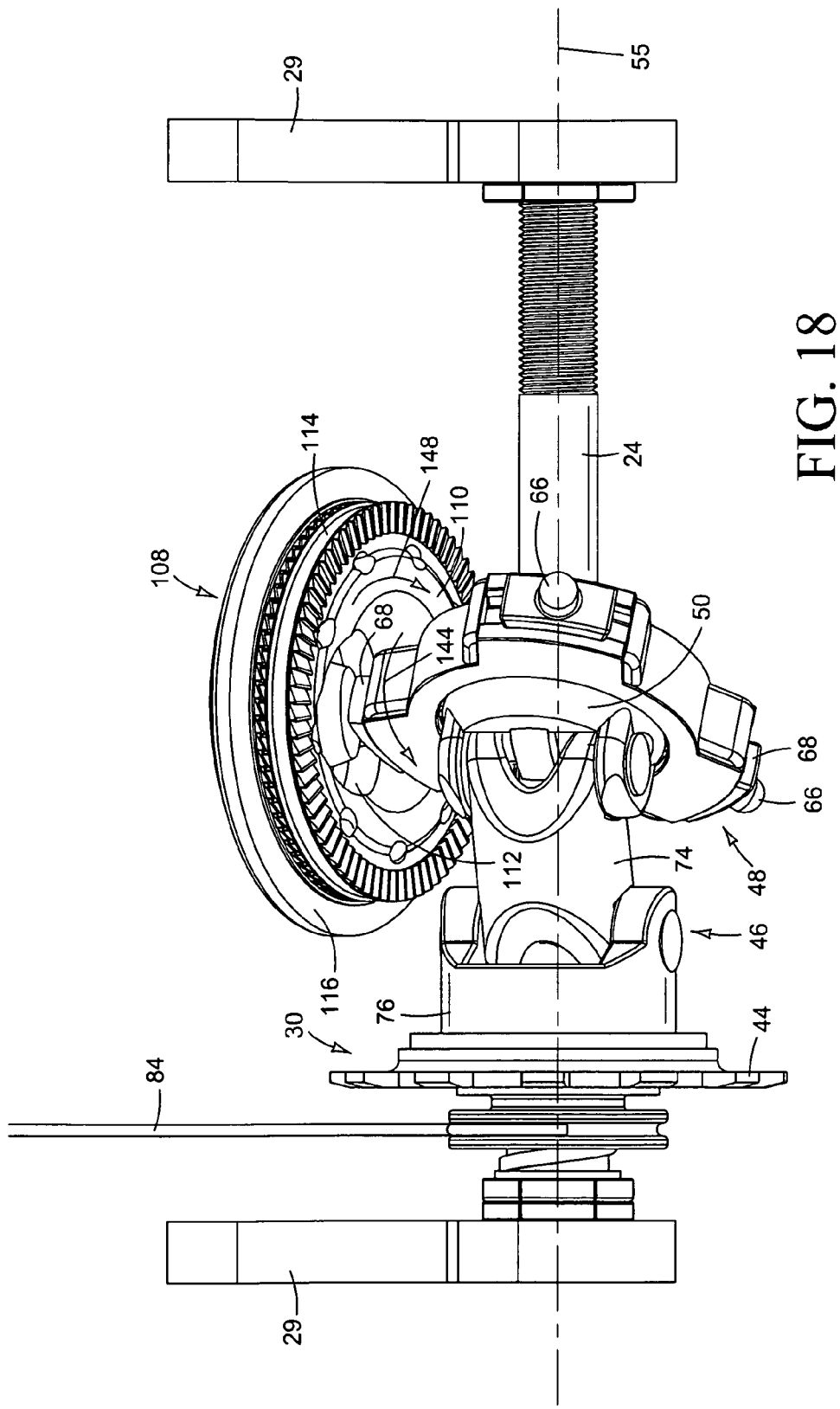
Figure 19:
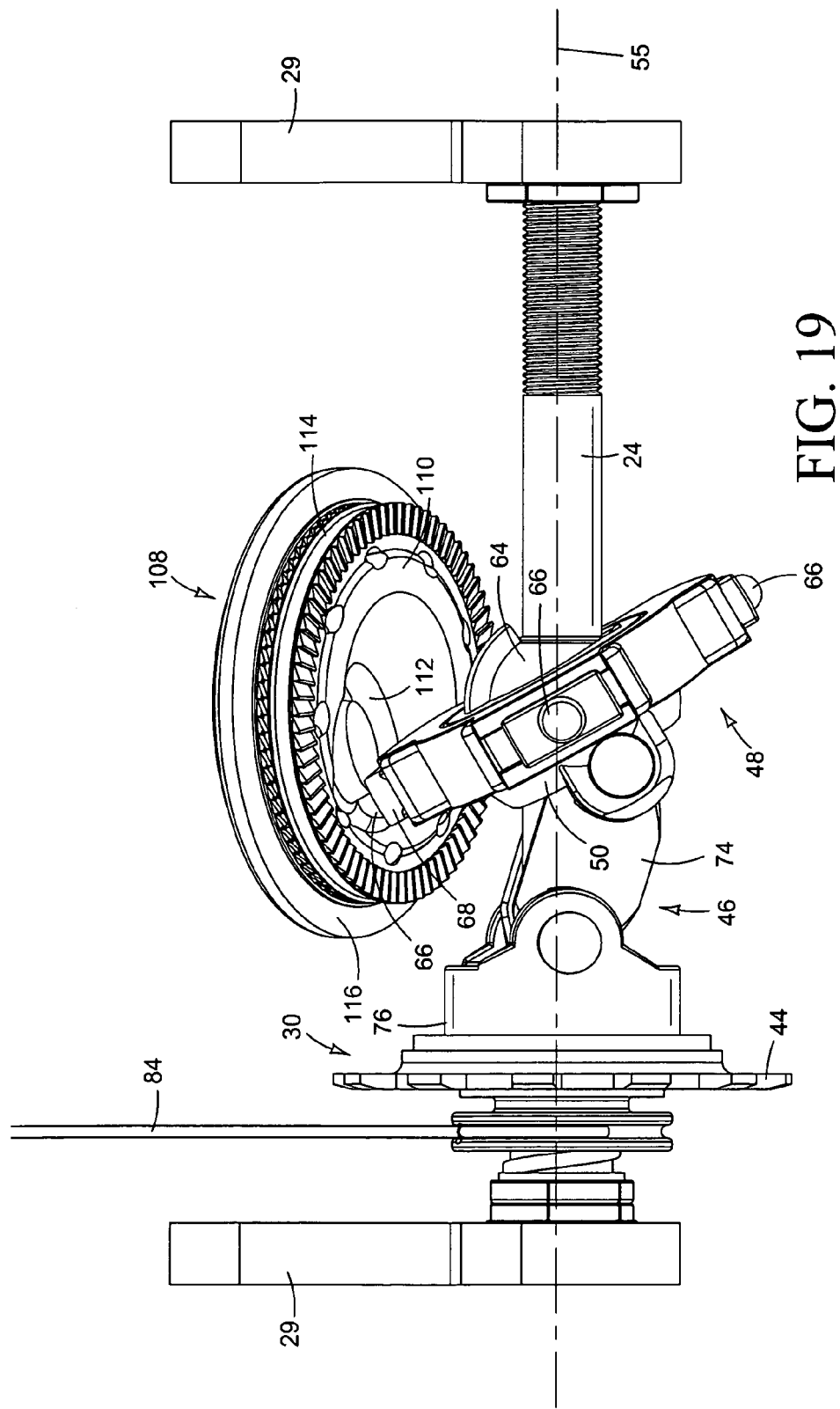
Figure 20:
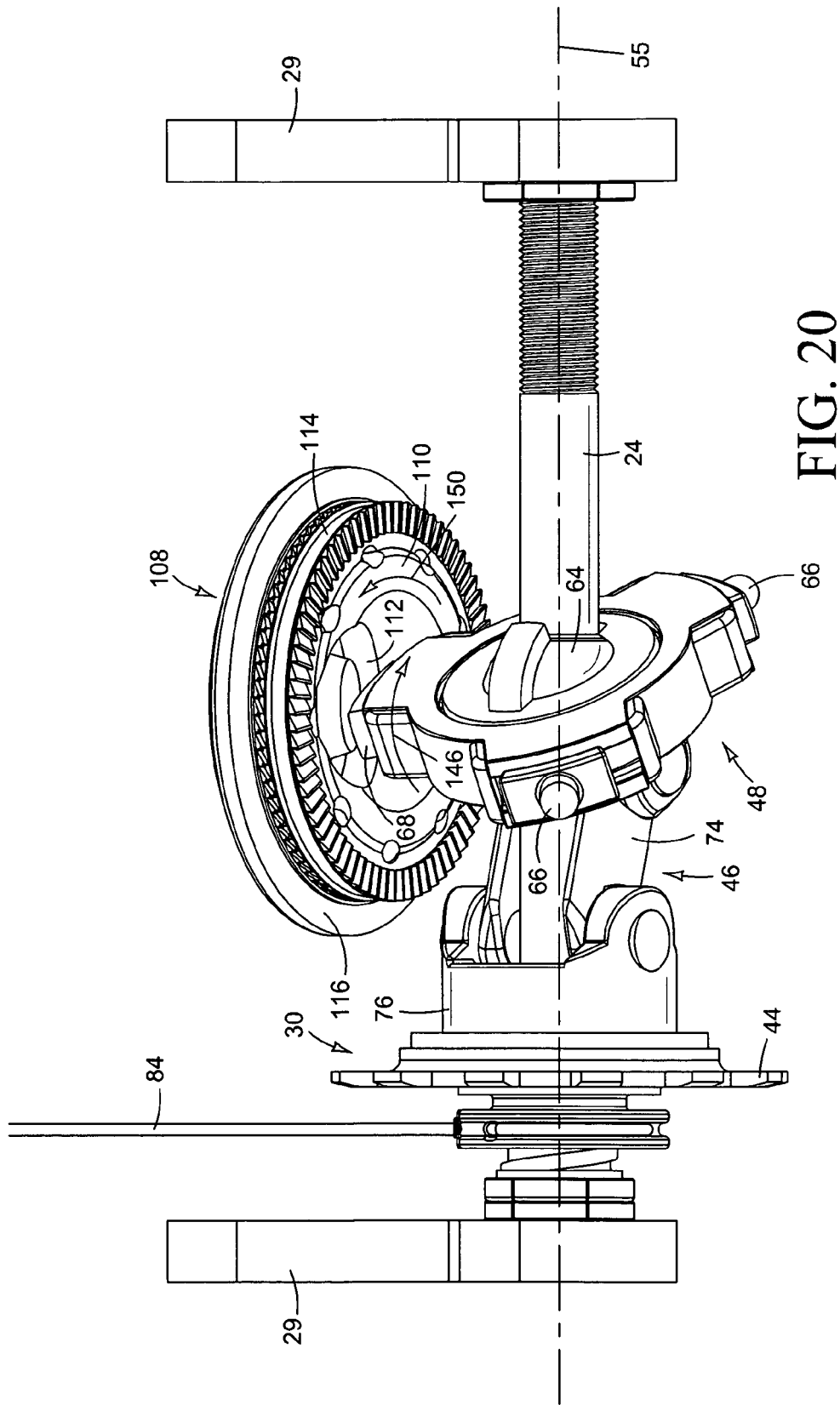
Figure 21:
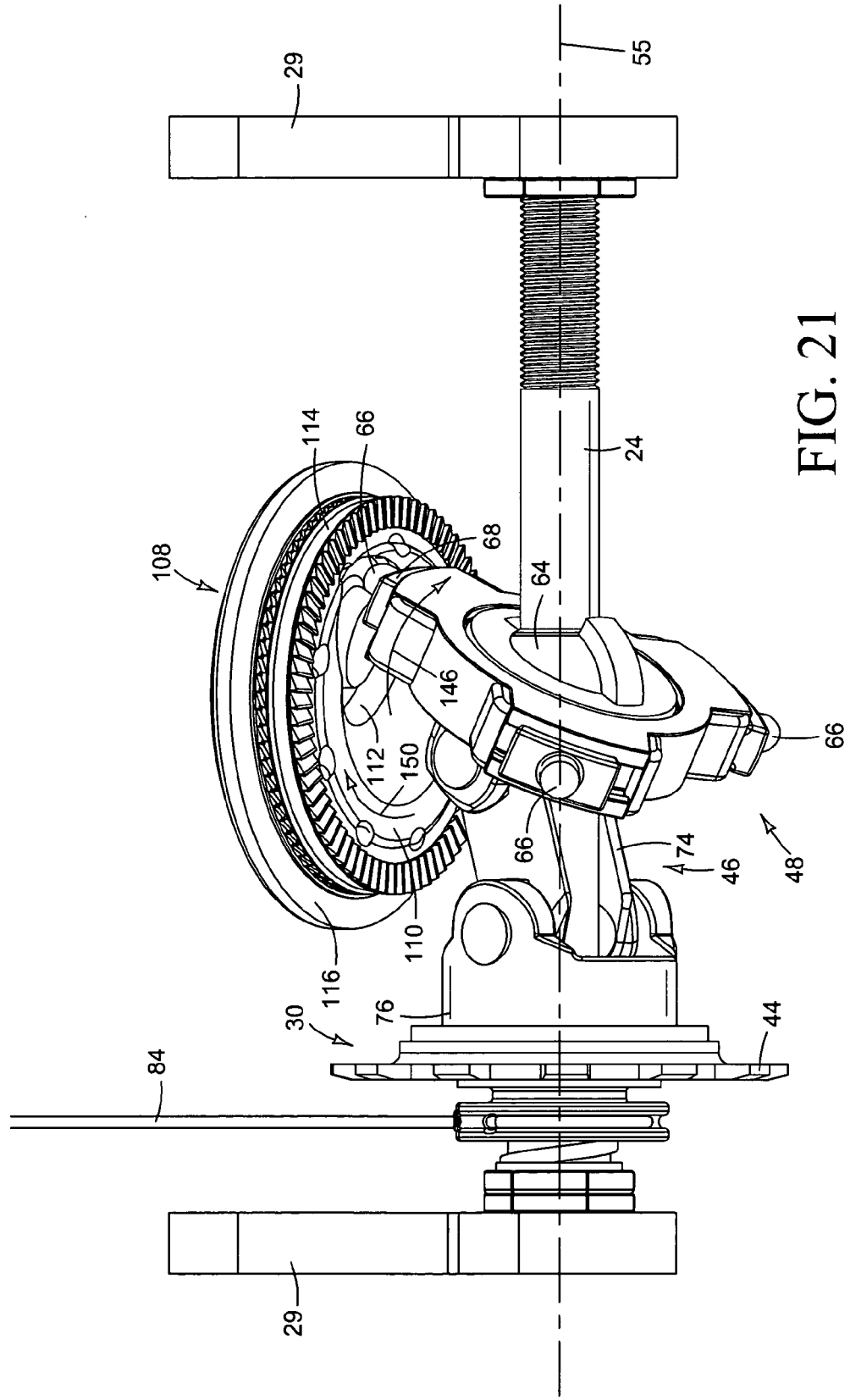

Drive post 66 traces an arc in one direction through the first half of the wobble cycle, 180° of revolution of drive shaft 46 and wobble ring 50, as indicated by direction arrow 144 in FIG. 18 (and as best seen by comparing FIGS. 17, 18 and 19), and then back in the opposite direction through the second half of the wobble cycle, as indicated by direction arrows 146 in FIGS. 20 and 21 (and as best seen by comparing FIGS. 19, 20, 21, and 17). Accordingly, post 66 acting through track 112 drives driver 110 clockwise through the first half of the cycle, as indicated by direction arrow 148 in FIG. 18 and counterclockwise in the second half of the cycle, as indicated by direction arrow 150 in FIGS. 20 and 21.

Referring again to FIG. 13, the clockwise rotation of driver 110 through the first half of the wobble cycle is transferred to planetary gear 100 as sawteeth 118 on the bottom of inner clutch plate 114 engage inner sawtooth part 106 of planetary gear 100, while sawteeth 120 on plate 114 freewheel over sawteeth 120 on outer clutch plate 116. Thus, planetary gear 100 is driven clockwise. Helical grooves 128 and 130 on driver 110 and inner clutch plate 114 not only allow freewheeling between plates 114 and 116, they also drive plate 114 down into inner part 106 to help ensure full engagement. In the second half of the wobble cycle, as driver 110 reverses to a counterclockwise rotation, inner clutch plate 114 is pushed up off planetary gear inner part 106 into engagement with outer plate 116 and sawteeth 118 on plate 114 freewheel over inboard inner part 106. Again, helical grooves 128 and 130 on driver 110 and inner clutch plate 114 not only allow freewheeling between inner part 106 and plate 114, they also drive plate 114 up into outer plate 116 to help ensure full engagement.

The counterclockwise rotation of outer plate 116 is transferred to planetary gear 100 through transfer gears 124 to continue to drive/rotate gear 100 clockwise. Thus, gear 100 is driven in the same direction (clockwise) throughout the full wobble cycle except for the momentary disconnect as driver 110 changes direction at each end of the wobble path of post 66. However, because sun gear 40 is being driven simultaneously by planetary gears 100 in each of the three PGA assemblies 34-38, sun gear 40 is unaffected by the momentary disconnect in each assembly 34-38. That is to say, transmission 16 is able to transmit power smoothly and continuously from sprocket 44 and drive shaft 46 to wheel 10.

Although only two PGAs are needed to cover the momentary disconnect of each individual PGA, referred to as a "dead spot" (as long as the PGAs are not diametrically opposed to one another), it is expected that three or more PGAs will be desirable in many applications to better mask the pulsing effect of each individual PGA. For example, with two PGAs, only one PGA is driving the sun gear through the dead spot of the other PGA. With three PGAs, however, two PGAs are driving the sun gear through the dead spot of each of the other PGAs. A three PGA configuration, therefore, not only makes each dead spot less noticeable to the sun gear, it also increases the output/load capacity of the transmission. For smaller transmissions, such as a bicycle transmission, it may not be feasible, or at least not practicable, to fit more than three PGAs around the sun gear. In larger transmissions, however, it may desirable and feasible to utilize more than three PGAs.

The use of a freewheel clutch 108 in each PGA 34-38, which allows each planetary gear 100 to freewheel, means that hub 14 does not also need to freewheel on sun gear 40, although it can. Also, because each planetary gear 100 may freewheel, all three planetary gears 100 will spin at the same speed. Although, ideally, each planetary gear 100 will be driven at the same speed when power is applied to sprocket 44 and drive shaft 46, any momentary variation in the drive speed among planetary gears 100 will not interfere with sun gear 40 because clutch 108 will automatically disengage a faster gear 100 from driver 110, allowing the faster gear to freewheel until slowing enough to re-engage driver 110.

Figure 23:
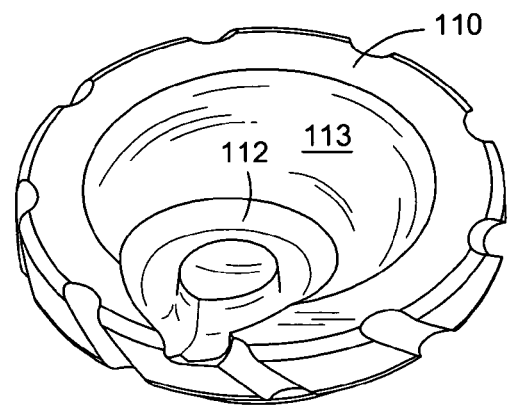
FIGS. 22-24 are plan, perspective, and section views, respectively, illustrating a tear dropped shape drive track.
Figure 22:
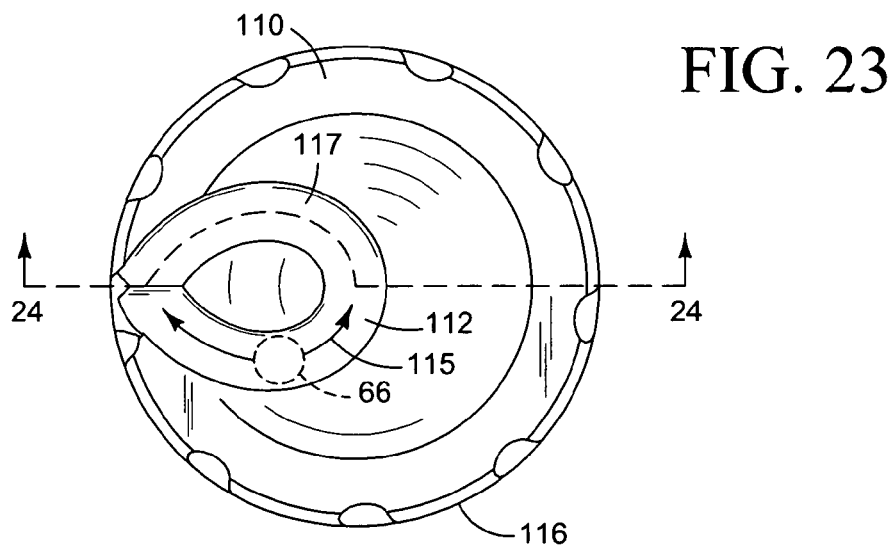
Figure 24:
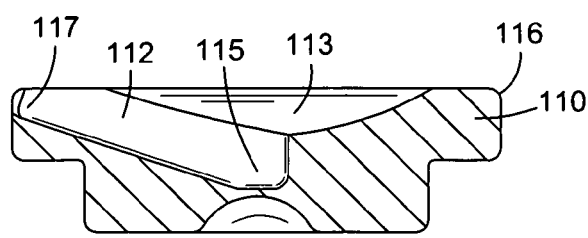

FIGS. 22-24 are plan, perspective, and section views, respectively, illustrating a tear dropped shape drive track 112 recessed into a cupped face 152 of driver 110. Referring to FIGS. 22-24, drive post 66 drives back and forth in track 112 in each wobble cycle, as depicted by the dashed lines in FIG. 22. A tear dropped shaped track 112 delivers more uniform rotational speed to driver 110 and, accordingly, to planetary gear 100. A tear drop shape is a shape in which a change in distance along the path traced by drive post 66 back and forth through a wobble cycle is constantly proportional to the corresponding change in distance along the outer periphery of driver 110 as it rotates back and forth through the wobble cycle. In a circular track 112, the rotational speed of driver 110 changes as post 66 drives out toward each end of the drive path, and back again. In a tear dropped shaped track 112, by contrast, the rotational speed of driver 110 is more constant as post 66 drives out toward each end of the drive path, and back again, for a more uniform, synchronized drive being delivered from driver 110 to planetary gears 100.

As noted above, each drive post 66 traces an arc back and forth as ring 50 and follower 62 wobble. Thus, it is desirable to vary the depth of track 112 according to the arc traced by post 66 to keep post 66 fully engaged in track 112 throughout its full range of travel. As shown in the section view of FIG.

24, track 112 may be more deep, therefore, at the middle part 115 of the path of post 66, where post 66 extends the furthest from axle 24, and less deep at the outer parts 117 of the path of post 66, where post 66 is closer to axle 24. Also, in some applications, it may be desirable to offset track 112 radially out from the center of driver 110 as far as practicable toward the rim to help maximize the degree of rotation of driver 110 through each wobble cycle.

Second Embodiment—Stationary Wobbler With Rotating Cage, Single Driver

Figure 25:
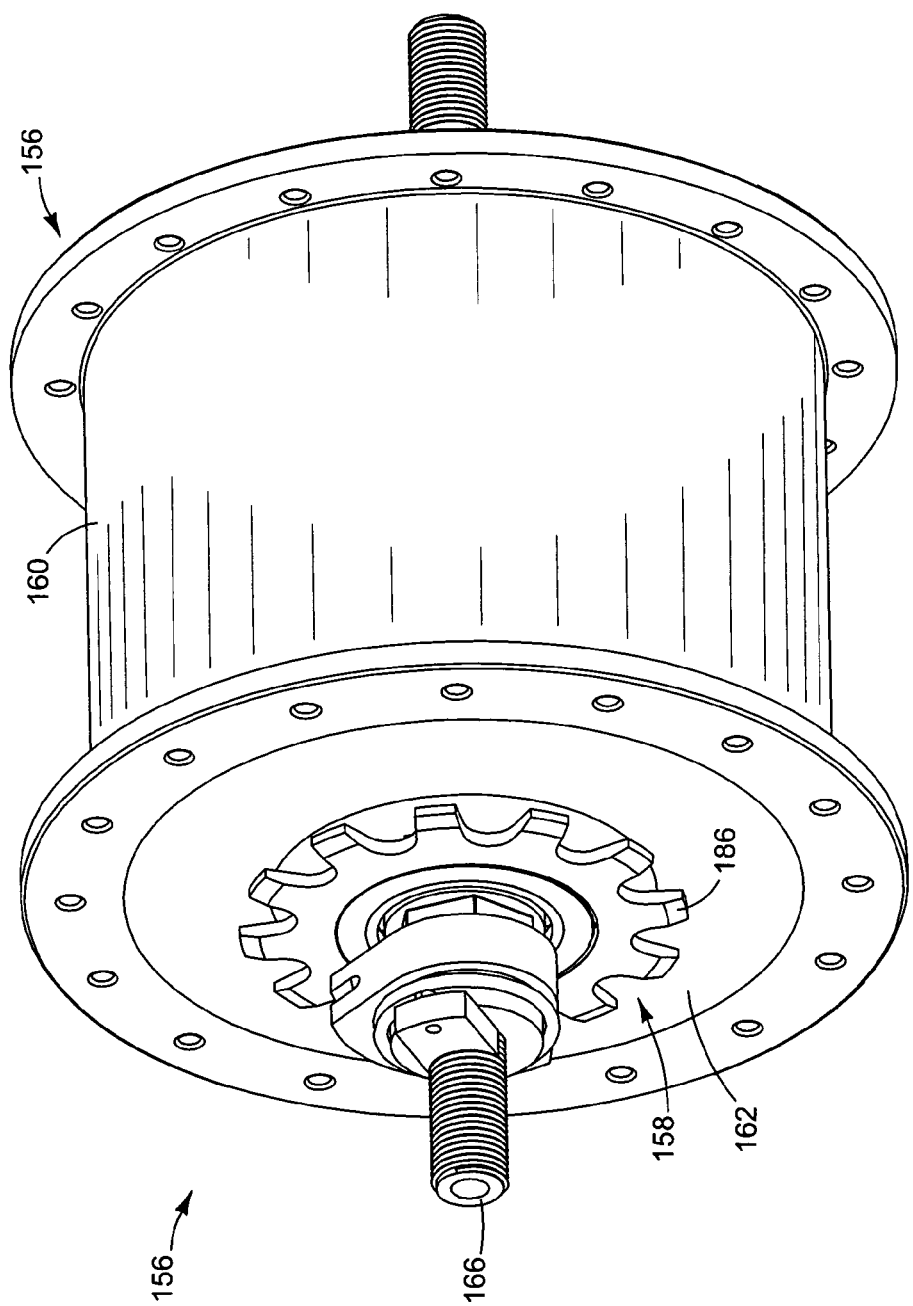
FIG. 25 is a perspective view of a bicycle rear wheel hub housing a transmission, according to a second embodiment of the invention.
Figure 26:
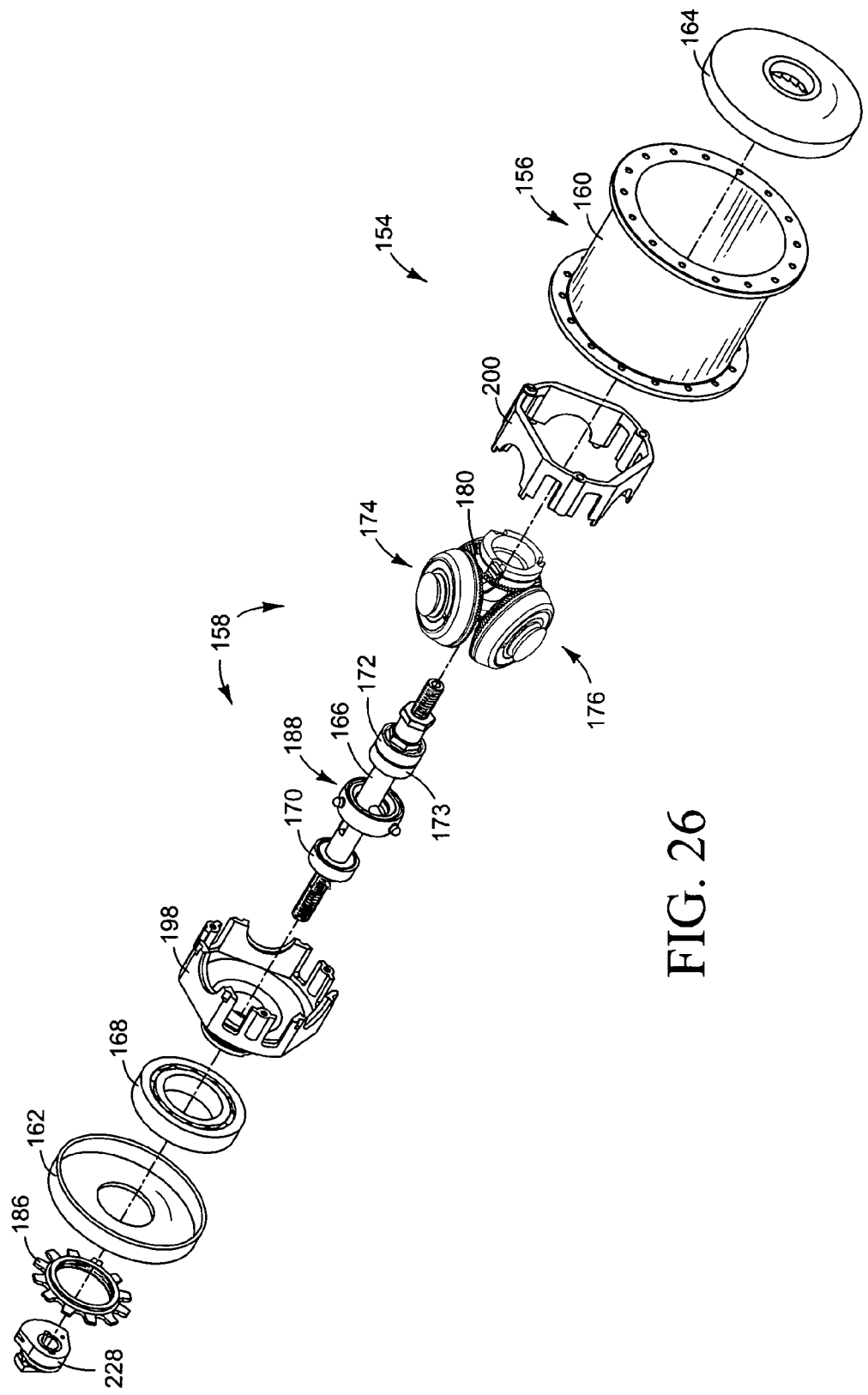
FIG. 26 is in exploded perspective view of the hub and transmission assembly shown in FIG. 25.

A second embodiment of the new transmission will now be described with reference to FIGS. 25-32. In this second embodiment, the planetary gear assemblies are rotated around a rotationally stationary wobbler and each planetary gear is driven through only one-half the wobble cycle. FIG. 25 is a perspective view of a bicycle rear wheel hub and transmission assembly 154, according to a second embodiment of the invention. FIG. 26 is in exploded perspective view of hub and transmission assembly 154. Referring to FIGS. 25 and 26, assembly 154 includes a hub 156 and a transmission 158. Hub 156 includes a cylindrical body 160 affixed to side covers 162 and 164. Hub 156 is supported for rotation about a stationary axle 166 at side cover 162 through a pair of bearings 168 and 170 and at side cover 164 through a hub/axle gearing 172.

Figure 27:
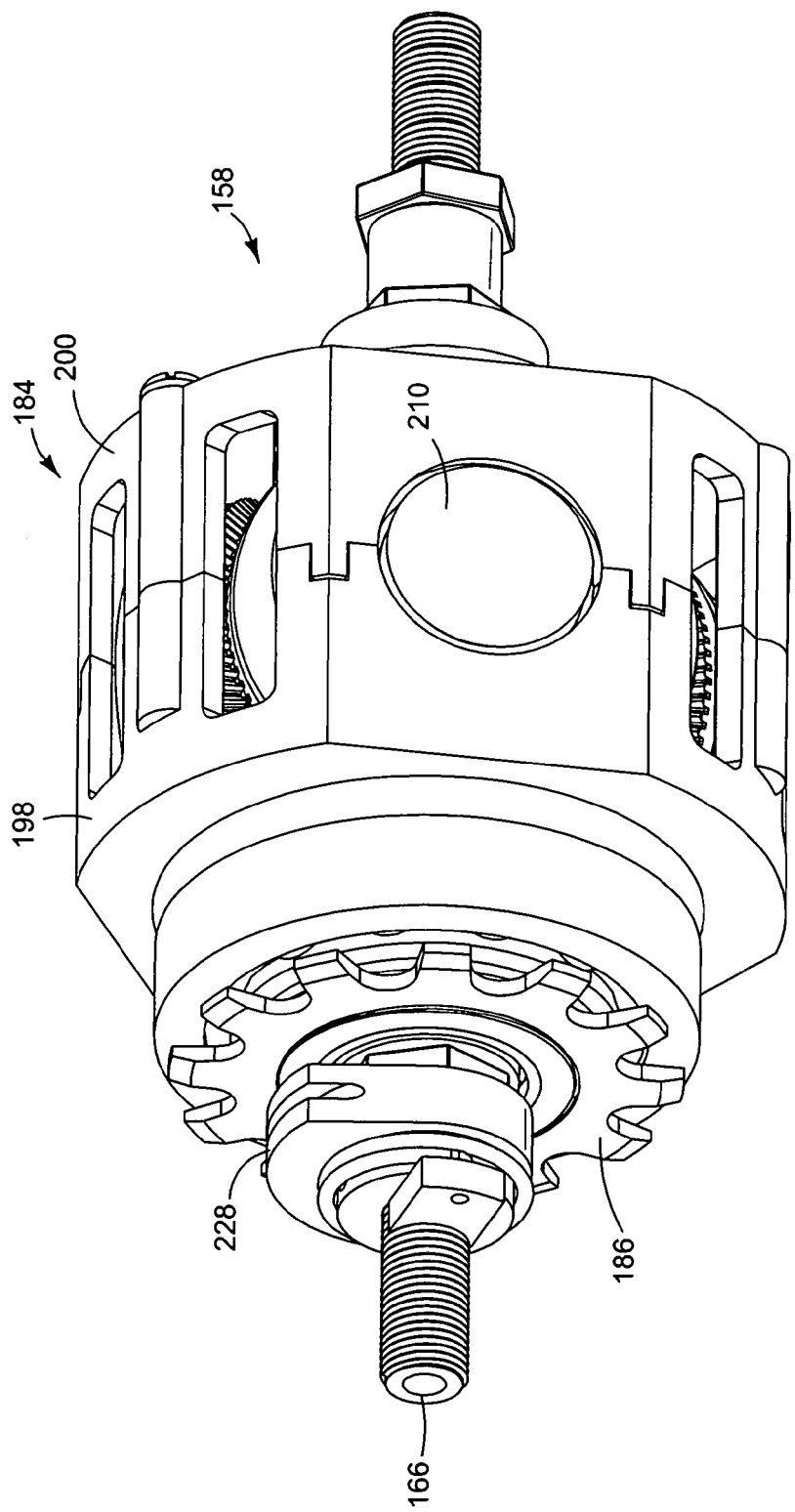
FIG. 27 is a perspective view of the transmission shown in FIGS. 25-26.
Figure 28:
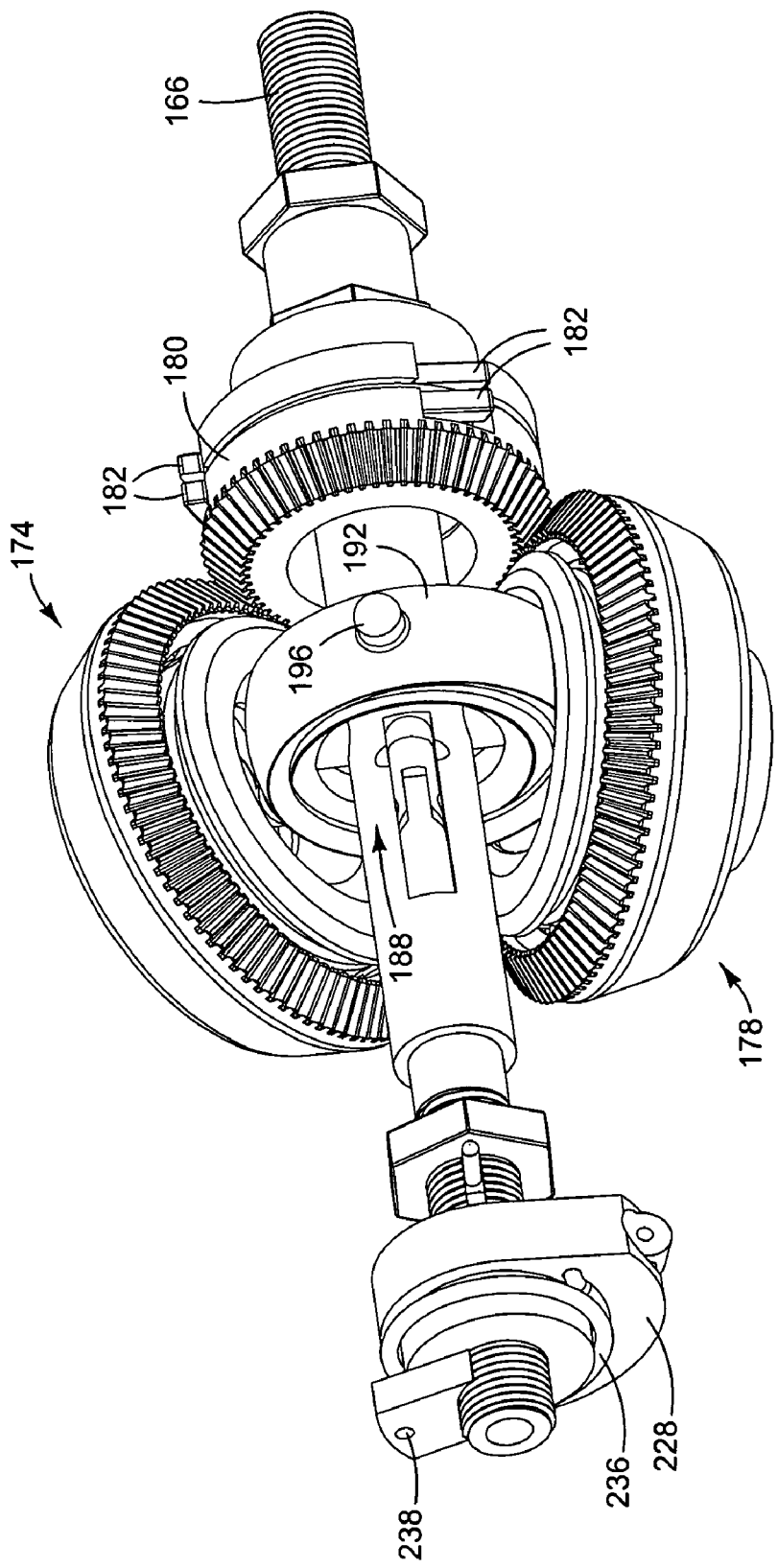
FIG. 28 is a perspective view of the transmission shown in FIGS. 25-27 partially disassembled to show some of the components not visible in the views of FIGS. 25-27.

FIG. 27 is a perspective view of transmission 158. FIG. 28 is a perspective view of transmission 158 partially disassembled to show some of the components not visible in the views of FIGS. 25-27. Referring now to FIGS. 26-28, transmission 158 includes three planetary gear assemblies (PGAs) 174, 176 and 178 that engage and drive a sun gear 180. Sun gear 180 is operatively coupled to hub 156 through a set of spring loaded drive pawls 182 that drive hub 156 at the urging of sun gear 180 while also allowing hub 156 to freewheel on sun gear 180. Sun gear 180 is supported for rotation on axle 166 through sun gear/axle bearing 173. Planetary gear assemblies 174-178 are held in a fixed relationship relative to one another and to sun gear 180 through a cage 184. Cage 184 is supported for rotation on axle 166 through cage/axle bearing 170. Thus, planetary gear assemblies 174-178 may rotate with respect to axle 166. Hub 156, which is driven by sun gear 180 and coasts with the wheel, may rotate with on cage 118 through hub/cage bearing 168.

Transmission 158 also includes a chain sprocket 186 affixed to cage 184 and a wobbler assembly 188 supported on axle 166. Referring now also to the exploded view of FIG. 29, wobbler assembly 188 includes a wobble ring 190 pinned or otherwise fastened to axle 166 so that wobble ring 188 may be tilted with respect to the longitudinal axis of axle 166. Wobbler assembly 188 also includes a follower 192 mounted to wobble ring 190 through a ring/follower bearing 194. Bearing 194 allows wobble ring 190 to remain rotationally stationary inside follower 192 as follower 192 rotates with cage 184. That is to say, wobble ring 190 does not rotate as it induces a wobble in a rotating follower 192. Follower drive posts 196 are mounted along the outer periphery of follower 192. As described in more detail below, each drive post 196 engages a drive mechanism in a corresponding one of the planetary gear assemblies 174-178.

Figure 29:
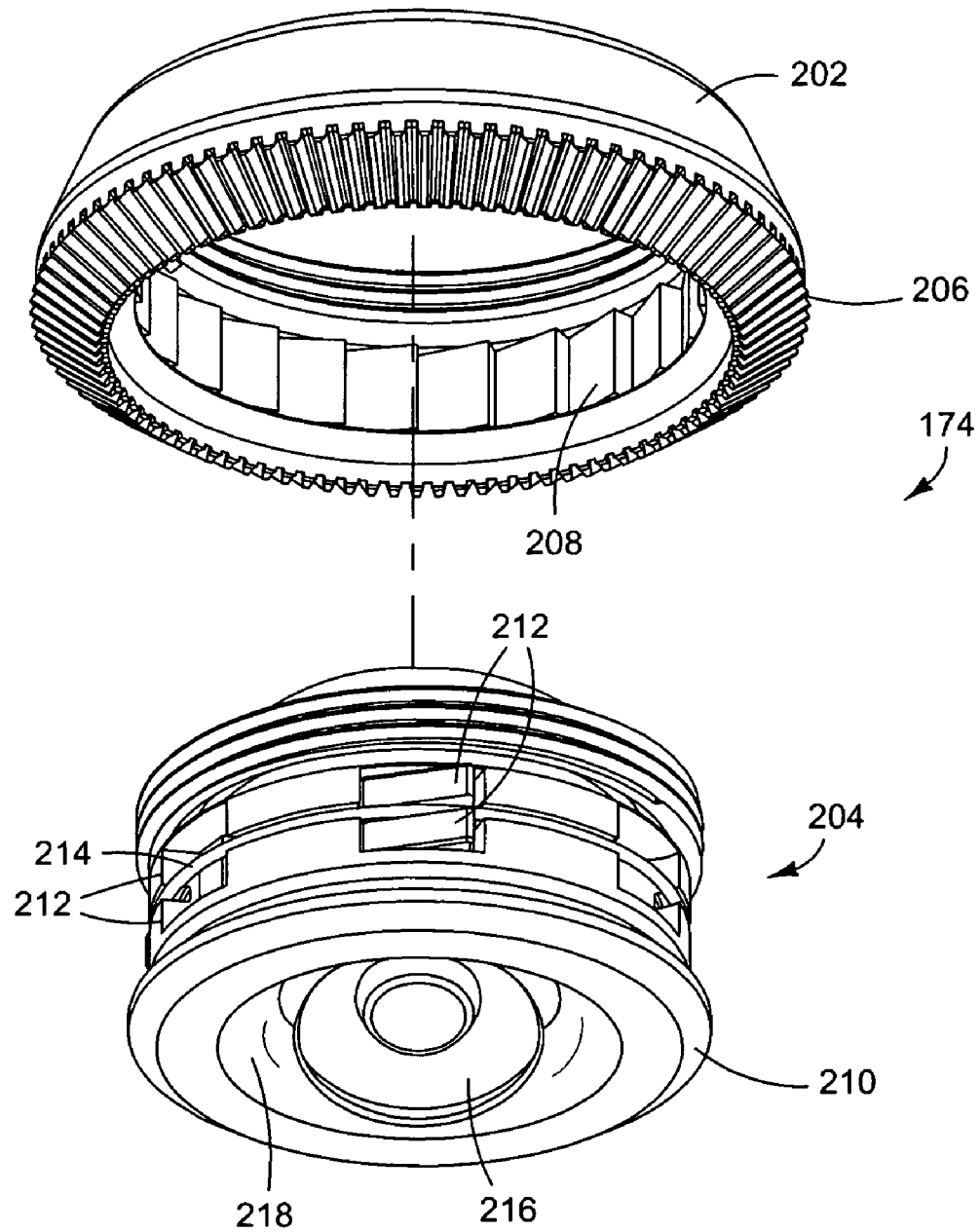
FIG. 29 is an exploded perspective view of one of the planetary gear assemblies in the output assembly of the transmission shown in FIGS. 25-28

FIG. 29 is an exploded perspective view of a planetary gear assembly 174. Referring to FIGS. 27-29, each planetary gear assembly 174-178 is held in a fixed relationship relative to the other planetary gear assemblies and to sun gear 180 through cage 184. In the embodiment shown, cage 184 includes two interconnected parts 198 and 200 that support and retain each planetary gear assembly in the proper position. Each planetary gear assembly 174-178 includes a planetary gear 202 connected to a drive post 196 through a PGA freewheeling clutch 204. In the embodiment shown, planetary gear 100 is an annular compound part that includes an outward facing bevel gear part 206 that engages sun gear 180 and an inner sawtooth part 208. (Inner sawtooth part 208 is functionally part of clutch 204 as described below.) Clutch 204 includes a driver 210 and a set of spring loaded pawls 212 (with pawl spring 214) mounted in the outer periphery of driver 210. Pawls 212 engage the sawteeth along the inner periphery of gear 202 to drive gear 202 forward while allowing gear 202 to freewheel on driver 210. Driver 210 engages drive post 196 along an arcuate drive track 216 recessed into the cupped inward face 218 of driver 210.

Figure 30:
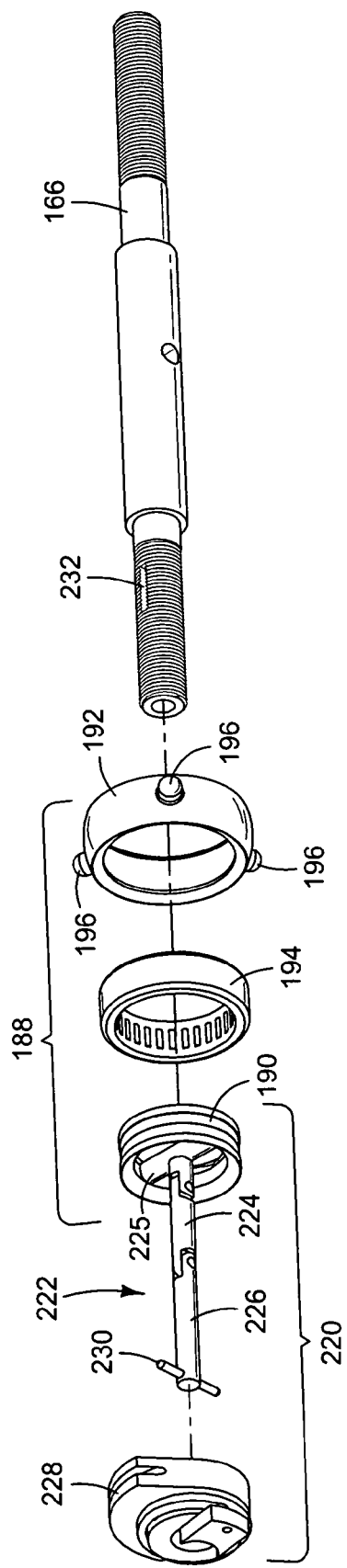
FIG. 30 is an exploded perspective view showing the shifter in the transmission of FIGS. 25-28.
Figures 31, 32:
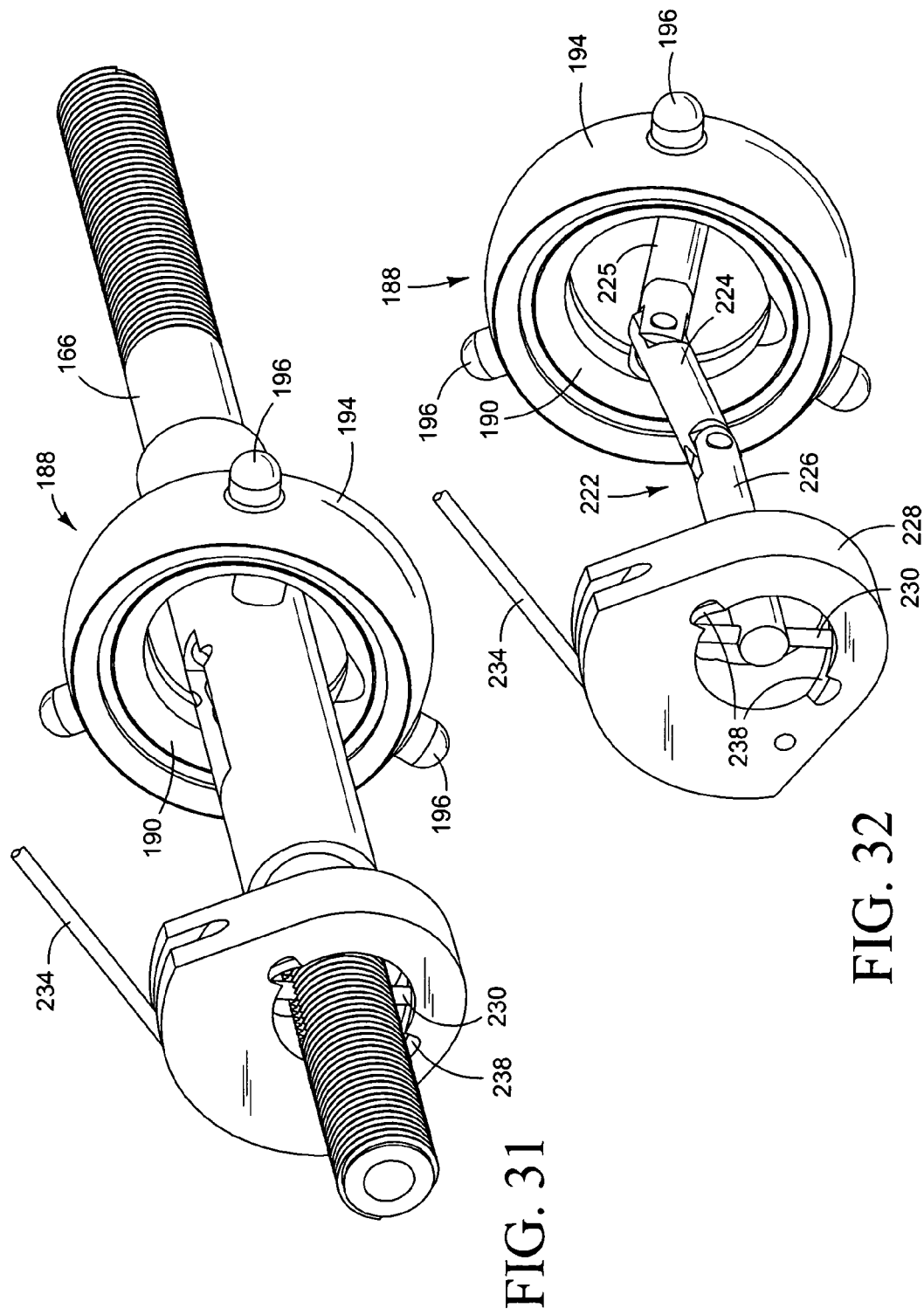
FIGS. 31 and 32 are perspective views illustrating the operation of the shifter shown in FIG. 30.

FIG. 30 is an exploded perspective view showing a shifter 220 for transmission 158. FIGS. 31 and 32 illustrate the operation of shifter 220. Referring to FIGS. 30-32, shifter 220 includes a segmented shifting rod 222 housed within a hollow axle 166. Shifting rod 222 includes an inner segment 224 and an outer segment 226. Segments 222 and 224 are pinned or otherwise gimbaled together so that segments 222 and 224 may pivot with respect to one another. Wobble ring 190 is pinned or otherwise gimbaled to drive shaft inner segment 224 at a cross bar 225 so that ring 190 and inner segment 224 may pivot with respect to one another as cross bar 225 is rotated, causing wobble ring 190 to tilt on axle 166 as shifting rod 222 is shortened and lengthened. Shifter 220 also includes a cable dial 228 that engages a T-handle 230 on the end of shifting rod outer segment 226. Handle 230 extends through slots 232 in axle 166 into a screw thread 238 in the inner diameter of dial 228. Rotating dial 228 "screws" T-handle 230 in or out along axle 166 to shorten or lengthen shifting rod 222 to adjust the tilt of wobble ring 190. A biasing spring 236 anchored to a bushing 238 urges dial 228 to a return position when tension from a shifting cable (not shown) is released.

The driving action of each post 196 in drive track 216 in this second embodiment is the same as that detailed above for the first embodiment. In both embodiments, the driving action is generated by rotating the wobbler or the wobbler follower on the wobble axis of rotation. In the first embodiment, the wobbler is driven around the axle on the wobble axis of rotation to wobble the wobbler. In the second embodiment, the follower is driven around the axle and the wobbler on the wobble axis of rotation so that the stationary wobbler induces a wobble in the rotating follower. Other configurations are possible. For example, the caged PGAs and the wobbler may both be driven around the wobble axis of rotation to generate the wobble driving action between the wobbler and each PGA.

Unlike the first embodiment, in which wobble ring 50 rotates while cage 43 holding the PGAs is stationary, the driving action in the second embodiment is generated by rotating cage 184 while wobble ring 190 remains rotationally stationary. Thus, as the rider pedals the bicycle, chain sprocket 186 turns cage 184 along with each PGA 174-178, specifically including clutch drivers 210. The rotating clutch drivers 210, acting on posts 196 through tracks 216, spin follower 192 around wobble ring 190. When wobble ring 190 is tilted on axle 166, posts 196 will oscillate back and forth as they spin around wobble ring 190 to alternatively rotate drivers 210 forward and backward. Each driver 210 engages and drives the corresponding planetary gear 202 forward during the forward part of the wobble cycle and then disengages gear 202 and freewheels during the backward part of the wobble cycle. One possible disadvantage of this second embodiment is the loss of speed ratios from greater than 0.0 through less than 1.0. Planetary gears 202 in the caged PGAs 174-178 continuously engage sun gear 180. Thus, once drivers 210 begin to drive planetary gears 202 through the motion of posts 166, gears 202 are driving sun gear 180 directly at a speed ratio of 1.0 or more.

Multiple drive posts 196 on follower 192 around wobble ring 190, and the corresponding planetary gears 202 that drive sun gear 180, apply a constant driving force to sun gear 180 despite the intermittent, pulsing drive of the individual planetary gears 202. Of course, there may be applications for transmission 158 in which it is desirable to harness the intermittent, pulsing drive of a single PGA.

For convenience, transmission 16 has been shown and described as including all of the components of input and output assemblies 30 and 32 despite the fact that the definitional boundaries of a transmission in some applications may or may not be deemed to include driving elements such as sprocket 44 and drive shaft 46 or driven elements such as sun gear 40. Hence, the components of transmission 16 shown in the Figures and described above, which illustrate a specific embodiment as set forth in this Description, should not be construed to require additional elements or otherwise limit the scope of a "transmission" as recited in the Claims.

As noted at the beginning of this Description, the example embodiments shown in the figures and described above illustrate but do not limit the disclosure. Other forms, details, and embodiments may be made and implemented. For example, the drive posts may be affixed to the wobbler so that each drive post wobbles through a full nutating path as the wobbler rotates. In this example, the cage and PGAs are allowed to spin as a unit so that a rotating wobbler will tend to drive the caged PGAs around the axle on the wobble axis of rotation simultaneously with driving each planetary gear around its gear axis of rotation. For another example, both the caged PGAs and the wobbler may be driven around the axle on the wobble axis of rotation at the same speed or different speeds in the same direction, or in opposite directions. Therefore, the foregoing description should not be construed to limit the scope of the disclosure, which is defined in the following claims.

What is claimed is:

1. A transmission, comprising:
a wobbler assembly having an outer periphery tiltable with respect to a wobble axis of rotation;
a freewheeling gear disposed in a radially fixed relationship with respect to the wobble axis of rotation wherein the wobbler assembly and the gear are rotatable with respect to one another about the wobble axis of rotation; and
wherein said gear is in contact with and operatively connected to the wobbler assembly at a place on the periphery of the wobbler assembly wherein said place on the periphery of the wobbler assembly traces a substantially curvilinear path as said wobbler assembly wobbles such that said gear rotates on its axis of rotation as the wobbler assembly wobbles.

2. The transmission of claim 1 further comprising a shifter operatively connected to the wobbler assembly for changing an angle of tilt, of the wobbler assembly with respect to the wobble axis of rotation.

3. The transmission of claim 2 wherein the shifter is operatively connected to the wobbler assembly such that the tilt angle may be changed when one or both of the wobbler assembly and said gear are rotating about the wobble axis of rotation.

4. The transmission of claim 2 wherein the shifter and the wobbler assembly are configured to allow shifting the tilt angle continuously through a range of tilt angles that includes zero degrees)(0° whereby a tilt angle of zero degrees)(0° results in zero output speed from said transmission.

5. The transmission of claim 2 wherein said wobbler assembly comprises a wobbler which is tiltable to a tilt angle relative to said wobble axis of rotation, a follower which is rotatably mounted to said wobbler, and a post attached to said follower wherein said post defines said place on the periphery of the wobbler assembly.

6. The transmission of claim 5 wherein said post is attached to said follower with a slider which allows said post to move circumferentially with respect to said follower, 7. The transmission of claim 1 or 5 further comprising a drive shaft that provides input drive to said wobbler assembly.

8. The transmission of claim 7 further comprising an axle that supports said transmission for rotation about said wobble axis of rotation, a bearing that supports said wobbler assembly on said axle such that said wobbler assembly can be tilted relative to said wobble axis of rotation.

9. The transmission of claim 1 wherein said freewheeling gear further comprises a driver, a clutch and a gear wherein said wobbler assembly is in contact with said driver, said clutch drivingly connects said gear to said driver whereby said gear is driven when said driver is rotated.

10. The transmission of claim 1 wherein said freewheeling gear further comprises a driver and a gear wherein said wobbler assembly is in contact with said driver and said driver drives said gear for freewheeling rotation thereupon.

11. The transmission of claim 1 wherein said wobbler assembly comprises an annular follower supported about an inner periphery on a circular outer periphery of a wobbler through a bearing that allows the wobbler and the follower to rotate with respect to one another, and wherein said freewheeling gear is operatively connected to the wobbler assembly through a post on an outer periphery of the follower wherein a driver is drivingly connected to said post on the outer periphery of the follower throughout a full wobble cycle such that the gear is driven by said driver in a forward direction along substantially the entire path traced by the post moving back and forth with the wobble.

12. The transmission of claim 1 wherein said freewheeling gear comprises a first annular gear plate that includes gear teeth on a first face and a clutch on a second face; and
said clutch comprises:
an engaging surface on said second face of said gear plate; and
an annular clutch plate having an engaging surface on a first face for engaging the engaging surface on the second face of said gear plate.

13. The transmission of claim 12 wherein said freewheeling gear further comprises a second engaging surface on a second face of said clutch plate, a second annular gear plate that includes gear teeth on a first face and an engaging surface on a second face;
wherein the first face of the clutch plate is oriented with respect to the second face of the first gear plate such that the engaging surface of the second face of the first gear plate and the engaging surface of the first face of the clutch plate engage one another in a first driving direction of said clutch plate and disengage from one another in a second driving direction of said clutch plate; and
wherein the second face of the clutch plate is oriented with respect to the second face of the second gear plate such that the engaging surface on the second face of the second gear plate and the engaging surface of the second face of the clutch plate engage one another in said second driving direction of said clutch plate and disengage from one another in said first driving direction of said clutch plate.

14. The transmission of claim 13 wherein said clutch plate disengages from both said gear plates when not driven.

15. The transmission of claim 13 wherein said second gear plate is drivingly connected to said first gear plate.

16. The transmission of claim 12 wherein said freewheeling gear further comprises a driver that is mounted concentrically within said annular clutch plate via a plurality of connecting elements each fitted into a respective one of a plurality, of pairs of mating helical grooves formed along an outer periphery of said driver and along an inner periphery of the annular clutch plate such that the connecting elements transmit a rotational driving force of the driver to the clutch plate while at the same time allowing the clutch plate to translate with respect to the driver.

17. The transmission of claim 1 wherein said freewheeling gear comprises an arcuate track that is in contact with and operatively connected to said place on the periphery of the wobbler assembly.

18. The transmission of claim 17 wherein the arcuate track comprises a circular track.

19. The transmission of claim 17 wherein the arcuate track comprises a teardrop track.

20. The transmission of claim 17 wherein a depth of the arcuate track varies from a greater depth at a center of a path traced by said post as said wobbler assembly wobbles to a lesser depth at each end of the path traced by said post as said wobbler assembly wobbles.

21. The transmission of claim 1 wherein said freewheeling gear engages a sun gear whereby said sun gear transmits an output of said transmission.

22. The transmission of claim 21 further comprising a plurality of freewheeling gears disposed in fixed relationship with respect to the wobble axis of rotation and wherein each said freewheeling gear engages said sun gear and wherein each said freewheeling gear is in contact with and operatively connected to the wobbler assembly at different places on the periphery of the wobbler assembly.

23. A vehicle comprising a power source, a wheel, a transmission for transmitting power from said power source to said wheel wherein said transmission comprises a wobbler assembly having an outer periphery tiltable with respect to a wobble axis of rotation;
   a freewheeling gear disposed in a radially fixed relationship with respect to the wobble axis of rotation wherein the wobbler assembly and the gear are rotatable with respect to one another about the wobble axis of rotation; and
   wherein said gear is in contact with and operatively connected to the wobbler assembly at a place on the periphery of the wobbler assembly wherein said place on the periphery of the wobbler assembly traces a substantially curvilinear path as said wobbler assembly wobbles such that said gear rotates on its axis of rotation as the wobbler assembly wobbles.

24. A bicycle comprising a power source, a wheel, a transmission for transmitting power from said power source to said wheel wherein said transmission comprises a wobbler assembly having an outer periphery tiltable with respect to a wobble axis of rotation;
   a freewheeling gear disposed in a radially fixed relationship with respect to the wobble axis of rotation wherein the wobbler assembly and the gear are rotatable with respect to one another about the wobble axis of rotation; and
   wherein said gear is in contact with and operatively connected to the wobbler assembly at a place on the periphery of the wobbler assembly wherein said place on the periphery of the wobbler assembly traces a substantially curvilinear path as said wobbler assembly wobbles such that said gear rotates on its axis of rotation as the wobbler assembly wobbles.

25. A machine comprising a power source, a power output, a transmission for transmitting power from said power source to said power output wherein said transmission comprises a wobbler assembly having an outer periphery tiltable with respect to a wobble axis of rotation;
   a freewheeling gear disposed in a radially fixed relationship with respect to the wobble axis of rotation wherein the wobbler assembly and the gear are rotatable with respect to one another about the wobble axis of rotation; and
   wherein said gear is in contact with and operatively connected to the wobbler assembly at a place on the periphery of the wobbler assembly wherein said place on the periphery of the wobbler assembly traces a substantially curvilinear path as said wobbler assembly wobbles such that said gear rotates on its axis of rotation as the wobbler assembly wobbles.

26. A transmission comprising a wobbler assembly tiltable with respect to a wobble axis of rotation;
   at least 3 freewheeling gears disposed in a radially fixed relationship with respect to the wobble axis of rotation circumferentially spaced around the wobble axis of rotation wherein the wobbler assembly and the gear are rotatable with respect to one another about the wobble axis of rotation; and
   wherein said gears are operatively connected to the wobbler assembly such that said gears rotate on their axes of rotation as the wobbler assembly wobbles.

* * * * *